(12) United States Patent
Watts et al.

(10) Patent No.: US 10,809,591 B2
(45) Date of Patent: Oct. 20, 2020

(54) OPTICAL PHASE SHIFTER DEVICE

(71) Applicant: Analog Photonics LLC, Boston, MA (US)

(72) Inventors: Michael R. Watts, Hingham, MA (US); Ehsan Shah Hosseini, Milton, MA (US); Christopher Vincent Poulton, Cambridge, MA (US); Erman Timurdogan, Boston, MA (US)

(73) Assignee: Analog Photonics LLC, Boston, MA (US)

( * ) Notice: Subject to any disclaimer, the term of this patent is extended or adjusted under 35 U.S.C. 154(b) by 207 days.

(21) Appl. No.: 15/499,468

(22) Filed: Apr. 27, 2017

(65) Prior Publication Data

US 2017/0315387 A1 Nov. 2, 2017

Related U.S. Application Data

(60) Provisional application No. 62/329,178, filed on Apr. 28, 2016.

(51) Int. Cl.
*G02F 1/225* (2006.01)
*G02B 6/122* (2006.01)
(Continued)

(52) U.S. Cl.
CPC .......... *G02F 1/225* (2013.01); *G02B 6/1223* (2013.01); *G02B 6/29331* (2013.01);
(Continued)

(58) Field of Classification Search
CPC .......... G02F 1/225; G02F 1/025; G02F 1/292; G02F 2001/0151; G02F 2203/10;
(Continued)

(56) References Cited

U.S. PATENT DOCUMENTS 5,082,342 A    1/1992    Wight et al.
5,883,603 A    3/1999    Kim
(Continued)

FOREIGN PATENT DOCUMENTS

EP    1027628 B1    1/2003
EP    1282834 B1    8/2005
(Continued)

OTHER PUBLICATIONS

Harris et al., Efficient, compact and low loss thermos-optic phase shifter in silicon, Optics Express, V. 22, N. 9, 2014 (Year: 2014).*
(Continued)

*Primary Examiner* — Peter Radkowski
(74) *Attorney, Agent, or Firm* — Young Basile Hanlon & MacFarlane, P.C.

(57) ABSTRACT

An optical phase shifter may include a waveguide core that has a top surface, and a semiconductor contact that is laterally displaced relative to the waveguide core and is electrically connected to the waveguide core. A top surface of the semiconductor contact is above the top surface of the waveguide core. The waveguide core may include a p-type core region and an n-type core region. A p-type semiconductor region may be in physical contact with the n-type core region of the waveguide core, and an n-type semiconductor region may be in physical contact with the p-type core region of the waveguide core. A phase shifter region and a light-emitting region may be disposed at different depth levels, and the light-emitting region may emit light from a phase shifter region that is in a position adjacent to the light-emitting region.

13 Claims, 21 Drawing Sheets

(51) Int. Cl.
*G02B 6/293* (2006.01)
*G02F 1/025* (2006.01)
*G02F 1/29* (2006.01)
*G02F 1/015* (2006.01)

(52) U.S. Cl.
CPC .............. *G02F 1/025* (2013.01); *G02F 1/292* (2013.01); *G02F 2001/0151* (2013.01); *G02F 2203/10* (2013.01); *G02F 2203/20* (2013.01); *G02F 2203/24* (2013.01); *G02F 2203/50* (2013.01)

(58) Field of Classification Search
CPC ............. G02F 2203/20; G02F 2203/24; G02F 2203/50; G02B 6/1223; G02B 6/29331
See application file for complete search history.

(56) References Cited

U.S. PATENT DOCUMENTS

| | | | |
|---|---|---|---|
| 6,813,431 B2 | 11/2004 | Davids et al. | |
| 7,167,605 B2* | 1/2007 | Chang | B82Y 20/00 385/2 |
| 7,177,236 B2 | 2/2007 | Harchanko et al. | |
| 7,565,084 B1* | 7/2009 | Wach | H04B 10/506 398/183 |
| 7,965,949 B1* | 6/2011 | Wach | H04J 14/04 398/143 |
| 8,041,158 B2 | 10/2011 | Gill et al. | |
| 8,355,605 B1* | 1/2013 | Wach | G02B 6/122 385/16 |
| 8,494,311 B1* | 7/2013 | Wach | G02B 6/122 385/3 |
| 8,521,038 B1* | 8/2013 | Wach | H04J 14/04 398/161 |
| 8,611,747 B1* | 12/2013 | Wach | H04J 14/04 398/79 |
| 8,755,647 B2* | 6/2014 | Yaacobi | G02B 6/264 385/27 |
| 8,988,754 B2 | 3/2015 | Sun et al. | |
| 9,020,351 B1* | 4/2015 | Wach | H04J 14/02 398/79 |
| 9,036,953 B2 | 5/2015 | Witzens et al. | |
| 9,065,572 B1* | 6/2015 | Wach | H04J 14/04 |
| 9,274,283 B1 | 3/2016 | Ellis-Monaghan et al. | |
| 9,628,187 B1* | 4/2017 | Wach | G02B 6/122 |
| 9,784,914 B2* | 10/2017 | Jiang | G02B 6/122 |
| 10,101,630 B2 | 10/2018 | Watts et al. | |
| 2005/0117829 A1* | 6/2005 | Chang | B82Y 20/00 385/1 |
| 2011/0235961 A1 | 9/2011 | Hashimoto | |
| 2012/0187421 A1 | 7/2012 | Cheng et al. | |
| 2013/0272652 A1* | 10/2013 | Yaacobi | G02B 6/264 385/27 |
| 2014/0192394 A1 | 7/2014 | Sun et al. | |
| 2014/0193115 A1 | 7/2014 | Popovic | |
| 2015/0277158 A1 | 10/2015 | Akiyama | |
| 2016/0172527 A1 | 6/2016 | Beechem, III et al. | |
| 2016/0190677 A1 | 6/2016 | Tseng | |
| 2016/0231506 A1* | 8/2016 | Jiang | G02B 6/122 |
| 2016/0334648 A1 | 11/2016 | Lu et al. | |
| 2017/0371227 A1 | 12/2017 | Skirlo et al. | |

FOREIGN PATENT DOCUMENTS

| | | | | |
|---|---|---|---|---|
| WO | WO-2015038927 A2 * | 3/2015 | ............. | G02B 6/122 |
| WO | WO-2015038927 A3 * | 11/2015 | ............. | G02B 6/122 |

OTHER PUBLICATIONS

Song et al., High-density waveguide superlattices with low crosstalk, Nature Communications, 6:7027 | DOI: 10.1038/ncomms8027 |www.nature.com/naturecommunications, 2015. (Year: 2015).*
Sun et al, Two-dimensional apodized silicon photonic phased arrays, Optics Letters, V. 39, N. 2, p. 367, 2014 (Year: 2014).*
Yaacobi et al., Integrated phased array for wide-angle beam steering, Optics Letters, V. 39, N. 15, p. 4575, 2014 (Year: 2014).*
Hulme et al., Fully integrated hybrid silicon two dimensional beam scanner, Optics Express, V. 23, N. 5, Feb. 25, 2015. (Year: 2015).*
Watts et al. (Low-Voltage, Compact, Depletion-Mode, Silicon Mach-Zehnder Modulator, IEEE Journal of Selected Topics in Quantum Electronics, vol. 16, No. 1, Jan./Feb. 2010, p. 159; "Watts") (Year: 2010).*
Reed et al. (Recent breakthroughs in carrier depletion based silicon optical modulators, Nanophotonics 2014; 3(4-5): 229-245; "Reed") (Year: 2014).*
Copeland et al. (p-n-p-n Optical Detectors and Light-Emitting Diodes, IEEE Journal of Quantum Electronics, vol. QE-14, No. 11, Nov. 1978; Copelend) (Year: 1978).*
Patterson et al. (A Lightweight Organic X-Band Active Receiving Phased Array With Integrated SiGe Amplifiers and Phase Shifters, IEEE Transactions on Antennas and Propagation, vol. 59, No. 1, Jan. 2011; ":Patterson"). (Year: 2011).*
Azadeh et al., "Low Vpi Silicon photonics modulators with highly linear epitaxially grown phase shifters", Optics Express, V. 23, No. 18, 2015.
W. D. Sacher et al., "Wide bandwidth and high coupling efficiency Si3N4-on-SOI dual-level grating coupler", Optics Express, May 5, 2014, pp. 10938-10947, vol. 22, No. 9.
H. Zhang et al., "Efficient silicon nitride grating coupler with distributed Bragg reflectors", Optics Express, Sep. 8, 2014, pp. 21800-21805 , vol. 22, No. 18.
D. Kwong et al., "On-chip silicon optical phased array for two-dimensional beam steering", Optics Letters, Feb. 15, 2014, pp. 941-944, vol. 39, No. 4.
T. Cao et al., "Design of a silicon Mach-Zehnder modulator with a U-type PN junction", Applied Optics, Aug. 20, 2013, pp. 5941-5948, vol. 52, No. 24.
Y. Liu et al., "Ultra-Responsive Phase Shifters for Depletion Mode Silicon Modulators", Journal of Lightwave Technology, Dec. 1, 2013, pp. 3787-3793, vol. 31, No. 23.
Kudo et al., "Analysis of interchannel crosstalk in multimode parallel optical waveguides using the beam propagation method", Optics Express, V. 22, N. 8., 2014.
Abediasl et al., Monolithic optical phased-array transceiver in a standard SOI CMOS process, Optics Express, V. 23, N. 5, 2015.
Sun et al., Large-Scale Silicon Photonic Circuits for Optical Phased Arrays, IEEE Journal of Selected Topics in Quantum Electronics, vol. 20, No. 4, 2014.
Timurdogan et al., An Ultra Low Power 3D Integrated Intra-Chip Silicon Electronic-Photonic Link, Th5B.8pdf, 2015.
Hudock, Jared, Optical Wave Propagation in Discrete Waveguide Arrays, Dissertation, University of Central Florida, 2005.
Khan et al., Complementary apodized grating waveguides for tunable optical delay lines, Optics Express, V. 20, N. 18, 2012.
Poulton et al., Optical Phased Array with Small Spot Size, High Steering Range and Grouped Cascaded Phase Shifters, in Advanced Photonics 2016 (IPR, NOMA, Sensors, Networks, SPPCom, SOF), OSA technical Digest (online) (Optical Society of America, 2016), paper IW1B.2.2.
Kumar, Anil, Optical Nano-Antennas: Fabrication, Characterization and Applications, University of Illinois, 2011.

* cited by examiner

TOP VIEW:

CROSS-SECTIONAL VIEW:

TOP VIEW:

CROSS-SECTIONAL VIEW:

TOP VIEW:

CROSS-SECTIONAL VIEW A:

CROSS-SECTIONAL VIEW B:

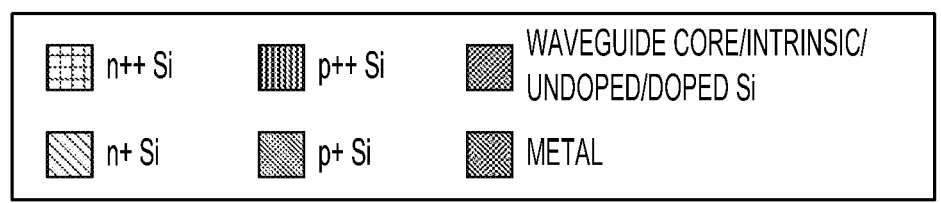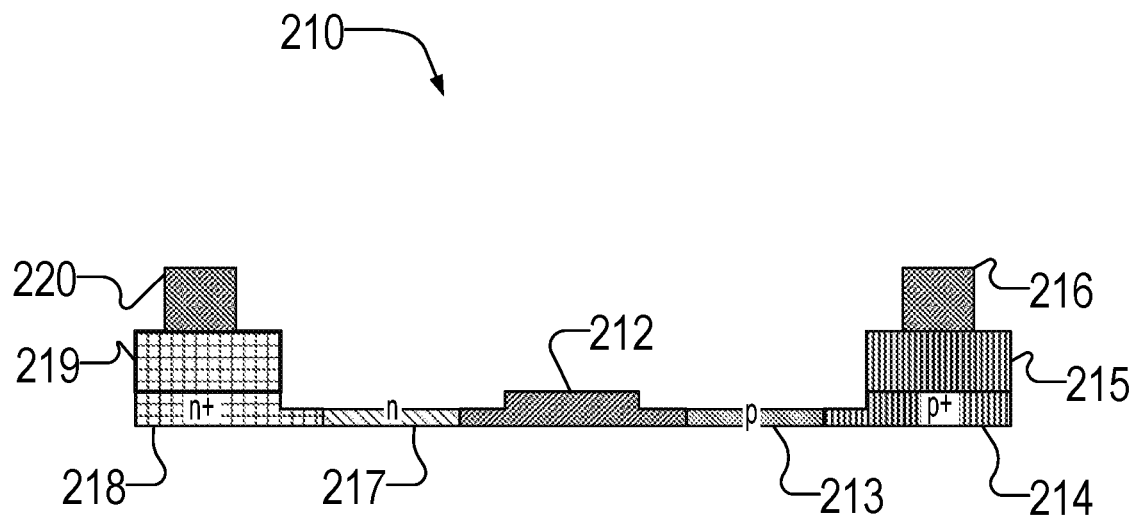
FIG. 18

OPTICAL PHASE SHIFTER DEVICE

CROSS-REFERENCE TO RELATED APPLICATIONS

This application claims the benefit of U.S. Provisional Application No. 62/329,178, filed Apr. 28, 2016, titled "OPTICAL EMISSION USING PHASE MISMATCHED WAVEGUDIES AND GRATINGS," the entire contents of which is hereby incorporated herein by reference to the maximum extent allowable by law.

BACKGROUND

Optical devices that emit optical radiation have a wide range of applicability, including in Light Detection And Ranging (LIDAR), communications, and biomedical devices. Light with a micron-scale wavelength allows for 0.001° angular resolution, when used for imaging, and antenna gain of more than 100 dB from a modest 10 cm×10 cm aperture, when used for communication. Such light has a frequency in the hundreds of terahertz range and wide operating bandwidths, allowing for high-speed data-transmission and three-dimensional imaging with sub-millimeter range resolution. In addition, optical beams at this wavelength have wide windows of low atmospheric absorption, allowing for long-range propagation over terahertz of optical bandwidth.

SUMMARY

An example of an optical device includes: a first waveguide having a first propagation constant; a second waveguide parallel to the first waveguide and having a second propagation constant that is different from the first propagation constant; a first grating antenna having a first grating period; and a second grating antenna having a second grating period different from the first grating period. The first grating antenna is configured to emit first light from the first waveguide, and the second grating antenna is configured to emit second light from the second waveguide. The first grating period and the second grating period are configured to emit the first light and the second light at a same emission angle.

Implementations of such an optical device may include one or more of the following features. The first propagation constant of the first waveguide may be a first function of a position along a length of the first waveguide. The second propagation constant of the second waveguide is a second function of a position along a length of the second waveguide. A value of the first propagation constant at most points along the length of the first waveguide may be different from a value of the second propagation constant at a corresponding point along the length of the second waveguide. The first grating period may be configured to emit the first light a first emission angle that is a function of the position along the length of the first waveguide. The second grating period is configured to emit the second light at a second emission angle that is a function of the position along the length of the second waveguide. A value of the first emission angle at every point along the length of the first waveguide may be equal to a value of the second emission angle at a corresponding point along the length of the second waveguide.

Implementations of such an optical device may further include one or more of the following features. The optical device may include a plurality of waveguides including the first waveguide and the second waveguide and at least one additional waveguide. Each waveguide of the plurality of waveguides may have a propagation constant that is different from a respective propagation constant of an adjacent waveguide. the first propagation constant of the first waveguide is a first vector ($\vec{\beta}_1$), the second propagation constant of the second waveguide is a vector ($\vec{\beta}_2$), a first wavenumber vector of the first grating antenna ($\vec{K}_1$), and a second wavenumber vector of the second grating antenna ($\vec{K}_2$) satisfy the following equation: $\vec{\beta}_1 + \vec{K}_1 = \vec{\beta}_2 + \vec{K}_2$. The first grating antenna may be etched into a core of the first waveguide. The second grating antenna may be etched into a core of the second waveguide. The first grating antenna may be above or below a core of the first waveguide. The second grating antenna may be above or below a core of the second waveguide. The first grating antenna may be adjacent to a core of the first waveguide at a same depth as the core of the first waveguide. The second grating antenna may be adjacent to a core of the second waveguide at a same depth as the core of the second waveguide.

Implementations of such an optical device may further include one or more of the following features. A width of a waveguide core of the first waveguide may be different from a width of a waveguide core of the second waveguide. A height of a waveguide core of the first waveguide may be different from a height of a waveguide core of the second waveguide. A material that forms a waveguide core of the first waveguide may have a different index of refraction from a material that forms a waveguide core of the second waveguide. A waveguide core of the first waveguide may be a distance from a waveguide core of the second waveguide, the distance being less than a single wavelength of the first light which the first waveguide is configured to guide. The optical device may include an antenna layer that includes the first waveguide, the second waveguide, the first grating antenna, and the second grating antenna. The optical device may include a phase shifter layer that includes a third waveguide, a fourth waveguide, a first phase shifter configured to apply a phase shift to the third waveguide, and a second phase shifter configured to apply a phase shift to the fourth waveguide. The third waveguide may be optically coupled to the first waveguide and the fourth waveguide may be optically coupled to the second waveguide. The third waveguide may have a third propagation constant, and the fourth waveguide may have a fourth propagation constant that is different from the third propagation constant. The optical device may include a splitting distribution network coupled to the first waveguide and the second waveguide. The optical device may further include: a first plurality of waveguides including the first waveguide, each waveguide of the first plurality of waveguides having the first propagation constant; and a second plurality of waveguides including the second waveguide, each waveguide of the second plurality of waveguides having the second propagation constant. The first plurality of waveguides and the second plurality of waveguides may be arranged in an alternating pattern such that each of the first plurality of waveguides is adjacent to at least one of the second plurality of waveguides.

An example of an optical device includes: a first optical path that includes a first waveguide having a first propagation constant; a second optical path that includes a second waveguide parallel to the first waveguide and having a second propagation constant that is different from the first propagation constant; a first antenna configured to emit first light from the first optical path; and a second antenna configured to emit second light from the second optical path. The first waveguide includes a first phase shifter configured to apply a phase shift along the first waveguide. The second waveguide includes a second phase shifter configured to apply a phase shift along the second waveguide.

Implementations of such an optical device may include one or more of the following features. The first optical path may include a third waveguide located at a different depth level than the first waveguide. The first antenna may be configured to emit first light from the third waveguide. The second optical path may include a fourth waveguide located at a different depth level than the fourth waveguide. The second antenna may be configured to emit second light from the fourth waveguide. A total optical path length of the first waveguide may be equal to a total optical path length of the second waveguide. The first propagation constant of the first waveguide may change smoothly over the majority of a total length of the first waveguide. The second propagation constant of the second waveguide may change smoothly over the majority of a total length of the second waveguide. The first waveguide may include a first plurality of sections, the first propagation constant for each section of the first plurality of sections being uniform, and each section of the first plurality of sections being connected to an adjacent section of the first plurality of sections by a taper. The second waveguide may include a second plurality of sections, the second propagation constant for each section of the second plurality of sections being uniform, and each section of the second plurality of sections being connected to an adjacent section of the second plurality of sections by a taper.

Implementations of such an optical device may further include one or more of the following features. A width of a waveguide core of the first waveguide may be different from a width of a waveguide core of the second waveguide. A height of a waveguide core of the first waveguide may be different from a height of a waveguide core of the second waveguide. A material that forms a waveguide core of the first waveguide may have a different index of refraction from a material that forms a waveguide core of the second waveguide. The first antenna and the second antenna may be selected from a group consisting of a plasmonic antenna, a waveguide-termination antenna, and a resonant antenna.

An example integrated optical device includes: a waveguide cladding volume; a waveguide layer within the waveguide cladding volume, the waveguide layer including at least one waveguide core that is elongated in a longitudinal direction, and the at least one waveguide core and the waveguide cladding volume forming a waveguide; and a perturbation layer within the waveguide cladding volume. The perturbation layer includes: a first emitter layer that includes a first plurality of emitters displaced from the at least one waveguide core in a first direction perpendicular to the longitudinal direction; and a second emitter layer that includes a second plurality of emitters, the second emitter layer being farther from the waveguide core in the first direction than the first emitter layer.

Implementations of such an integrated optical device may include one or more of the following features. The perturbation layer may be separated from the waveguide layer by a first separation distance that is greater than zero. The first separation distance may be less than a single wavelength of the first light which the first waveguide is configured to guide. The first emitter layer may be separated from the second emitter layer by a second separation distance that is greater than zero. The second plurality of emitters may be offset by an offset distance in the longitudinal direction relative to the first plurality of emitters. The offset distance and the separation distance may be configured to emit light from the waveguide in a single direction. The offset distance may be approximately $\pm \lambda_{eff}/4 + m \lambda_{eff}/2$, wherein $\lambda_{eff}$ is an effective wavelength of light guided by the waveguide and m is an integer. The second separation distance is approximately $\lambda_c/4 + n\lambda_c/2$, wherein n is an integer and $\lambda_c$ is an effective wavelength of light in the cladding volume.

Implementations of such an integrated optical device may further include one or more of the following features. Each of the first plurality of emitters may have a first length in the longitudinal direction, and each of the second plurality of emitters may have a second length in the longitudinal direction. The second length may be different from the second length. A first thickness of the first plurality of emitters may be less than a second thickness of the second plurality of emitters. The first thickness and the second thickness may be in the depth direction. The first plurality of emitters may be formed from a first material and the second plurality of emitters may be formed from a second material that is different from the first material. A dielectric constant of the second material may be greater than a dielectric constant of the first material.

An example optical phase shifter includes: a waveguide core comprising a top surface and a bottom surface; and a semiconductor contact that is laterally displaced relative to the waveguide core and is electrically connected to the waveguide core. A top surface of the semiconductor contact is above the top surface of the waveguide core or a bottom surface of the semiconductor contact is below the bottom surface of the waveguide core.

Implementations of such an optical phase shifter may include one or more of the following features. The semiconductor contact may be a first semiconductor contact that is an n-type semiconductor contact. The optical phase shifter may include a second semiconductor contact that is n-type semiconductor contact that is laterally displaced relative to the waveguide core and is electrically connected to the waveguide core. A top surface of the second semiconductor contact may be above the top surface of the waveguide core or a bottom surface of the second semiconductor contact may be below the bottom surface of the waveguide core. A width of the semiconductor contact may be less than a width of the waveguide core. A first concentration of a dopant of the semiconductor contact at the top surface of the semiconductor contact may be greater than a second concentration of the dopant of the semiconductor contact at the bottom surface of the semiconductor contact. A doping profile of the semiconductor contact may smoothly transition from the first concentration of the dopant of the semiconductor contact at the top surface of the semiconductor contact to the second concentration of the dopant of the semiconductor contact at the bottom surface of the semiconductor contact.

Implementations of such an optical phase shifter may further include one or more of the following features. The semiconductor contact may include epitaxially grown semiconductor, deposited semiconductor, or etched semiconductor. The semiconductor contact may include silicon or silicon germanium. The waveguide core may include the same material as the semiconductor contact. The waveguide core may be a first waveguide core having a first propagation constant. The optical phase shifter may include a second waveguide core having a second propagation constant that is different from the first propagation constant. The second waveguide core may be adjacent to the first waveguide core. The semiconductor contact may be electrically connected to the second waveguide core.

An example integrated optical phase shifter includes: a waveguide core comprising a p-type core region and an n-type core region; a p-type semiconductor region in physical contact with the n-type core region of the waveguide core; an n-type semiconductor region in physical contact with the p-type core region of the waveguide core; a first electrical contact in contact with the p-type semiconductor region; and a second electrical contact in contact with the n-type semiconductor region.

Implementations of such an integrated optical phase shifter may include one or more of the following features. A level of a top surface of the waveguide core may be above a level of a top surface of the p-type semiconductor region and may be above a level of a top surface of the n-type semiconductor region. The n-type semiconductor region may be in physical contact with the n-type core region. The p-type semiconductor region may be in physical contact with the p-type core region.

An example integrated optical device includes: a plurality of waveguide cores disposed in an array oriented perpendicular to a longitudinal direction, each waveguide core of the plurality of waveguide cores being elongated in the longitudinal direction; a plurality of diode signal contacts disposed in a first signal contact array oriented in a transverse direction that is perpendicular to the longitudinal direction, a respective waveguide core of the plurality of waveguide cores separating each signal contact of the plurality of signal contacts; a plurality of diode ground contacts disposed in a first ground contact array oriented in the transverse direction, a respective waveguide core of the plurality of waveguide cores separating each ground contact of the plurality of ground contacts; and a plurality of diodes disposed in an array perpendicular to the longitudinal direction. Each diode of the plurality of diodes includes: a first diode ground contact of the plurality of diode ground contacts; and a first diode signal contact of the plurality of signal contacts.

Implementations of such an integrated optical device may include one or more of the following features. The first diode ground contact may be at a first position in the transverse direction, and the first diode signal contract may be at a second position in the transverse direction adjacent to the first position. The integrated optical device may include: a plurality of signal contact arrays comprising the first signal contact array; and a plurality of ground contact arrays comprising the second signal contact array. Each signal contact array of the plurality of signal contact arrays may be configured to be independently controlled. Each diode signal contact of the plurality of diode signal contacts may be electrically isolated from the other diode signal contacts of the plurality of diode signal contacts. A length of each diode signal contact of the plurality of diode signal contacts in the longitudinal direction may be different from a length of each diode ground contact of the plurality of diode ground contacts in the longitudinal direction. The plurality of diode signal contacts and the plurality of diode ground contacts may be epitaxially grown.

An example integrated optical device includes: a phase shifter layer that includes an array of phase shifter regions, each phase shifter region including a first plurality of waveguides and at least one phase shifter for at least a portion of the first plurality of waveguides. Each phase shifter region of the array of phase shifter regions is located at a respective position within the array of phase shifter regions. The integrated optical device also includes an antenna layer above or below the phase shifter layer, the antenna layer including an array of light-emitting regions, each light-emitting region including a second plurality of waveguides. Each light-emitting region of the array of light-emitting regions is located at a respective position within the array of light-emitting regions. Each light-emitting region of the array of light-emitting regions is configured to emit light received from a phase shifter region located at a position adjacent to a position of the light-emitting region.

Implementations of such an integrated optical device may include one or more of the following features. Each waveguide of the first plurality of waveguides of a phase shifter region at a first position within the array of phase shifter regions may be coupled to a respective waveguide of the second plurality of waveguides of a light-emitting region at a second position within the array of light-emitting regions via an optical layer transition. The second position is adjacent to the first position. The optical layer transition is selected from through group consisting of an inverse taper element, a grating-to-grating coupler, and a periscope. The integrated optical device may include a transition layer between the phase shifter layer and the emitting layer. The transition layer may include an array of transition regions, each transition region including a third plurality of waveguides. Each transition region of the array of transition regions may be located at a respective position within the array of transition regions, and each light-emitting region of the array of light-emitting regions may be configured to couple light received from a respective phase shifter region to a respective light-emitting region. The integrated optical device may include a plurality of splitting distribution networks, each splitting distribution network being configured to couple light to a respective phase shifter region. The plurality of splitting distribution networks may be at a same level as the phase shifter layer or at a level farther from the antenna layer than the phase shifter layer. Each waveguide of the second plurality of waveguides of a first light-emitting region may be above or below a respective waveguide of the first plurality of waveguides of a first phase shifter region array. Each waveguide of the first plurality of waveguides of the first phase shifter region may have a different propagation constant than the respective waveguide of the second plurality of waveguides of the first light-emitting region that is above or below each waveguide of the first plurality of waveguides.

BRIEF DESCRIPTION OF THE DRAWINGS

Various aspects and embodiments will be described with reference to the following figures. The figures are not necessarily drawn to scale. For purposes of clarity, not every component may be labeled in every drawing.

FIG. 18 is a cross-section view of a portion of a scalable phase shifter with metal contacts in contact with a raised semiconductor contact.

DETAILED DESCRIPTION

Figure 1A:
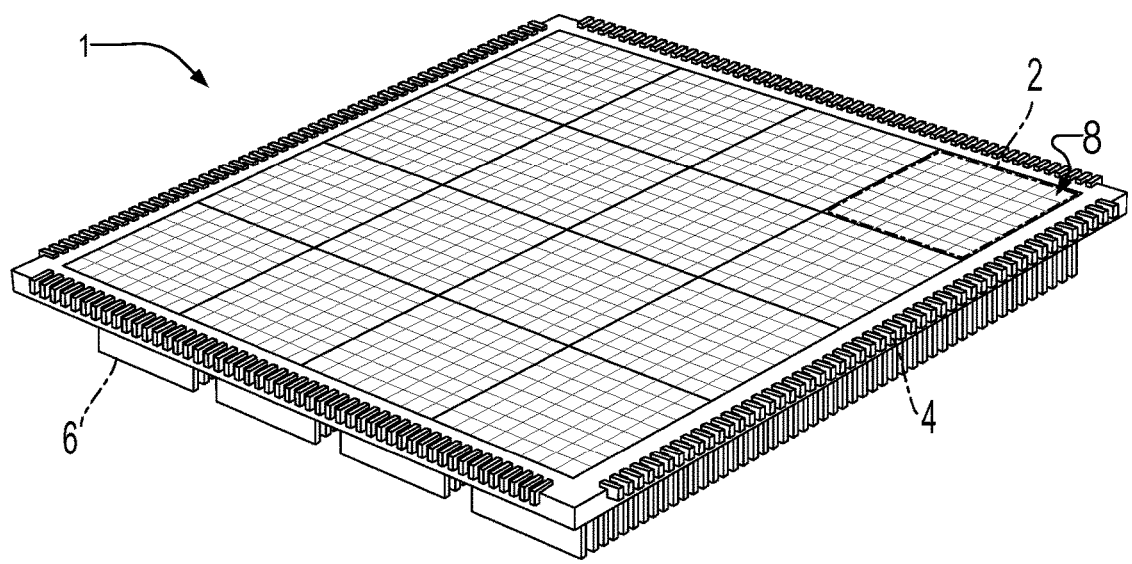
FIG. 1A is a perspective view of an optical device.
Figure 1B:
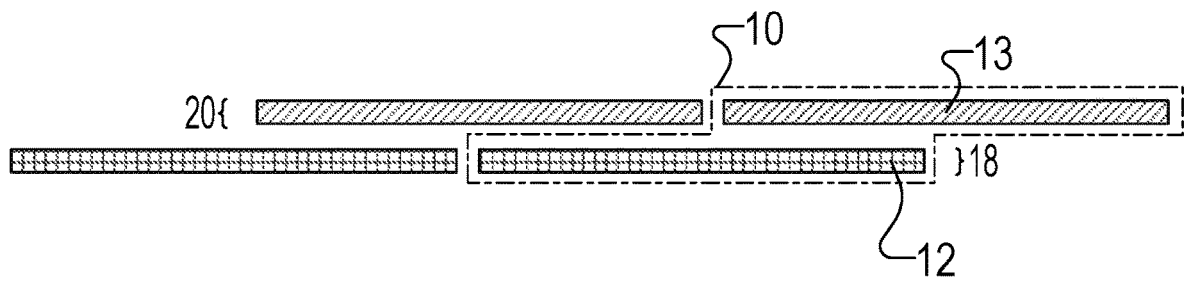
FIG. 1B is a block diagram of a cross-section view of a portion of the optical device of FIG. 1A.

The inventors have recognized and appreciated a need for optical devices for emitting optical radiation (referred to simply as "light" herein) that are compact and can emit coherent optical radiation with control over the angle of emission of the emitted optical radiation. Applications of such a device include LIDAR, communications and biomedical imaging, but applications are not limited to these fields. For example, implementations of one such optical device may be used to perform frequency modulated continuous wave (FMCW) LIDAR. The optical device may receive a multimode return signal. The optical device may also be used as a high-speed free-space optical communication link. The optical device may produce a single phased beam across a wide aperture (e.g., 100 cm$^2$) and/or numerous independent beams. Some implementations of the optical device may be integrated into a mobile communication system. Alternatively, the optical device may be integrated into a vehicle, such as an automobile, an aircraft or a ship.

Techniques are discussed herein for emitting light from an optical device that includes multiple waveguides, antennas and/or phase shifters configured to shift the phase of light guided by at least a subset of the waveguides. Such an optical device may be an optical phased array, but other optical devices may also benefit from the techniques described herein.

The inventors have recognized that there is a need for a light emitting optical device that is allows unidirectional emission of light in a controllable direction and is robust to variations that commonly occur during fabrication, such as proximity and rounding effects that can alter the physical geometry of a device in an unpredictable way when compared to a desired geometry. For example, some implementations of an optical device may include antennas that are distinct from the waveguides. The antennas may include multiple emitter elements that may, for example, be separated from the waveguides by a gap. By separating the guiding and emitting function of a perturbation layer of the optical device the emitter elements can cause light guided by the waveguides to be emitted without using emitter elements formed directly in the waveguide using partial or full etching. Instead, the emitter elements can be formed in a separate perturbation layer using full etching. By reducing the use of directly etching the waveguide in forming the optical device, the rounding and proximity effects are restricted to regions that are far from the optical mode of the light guided by the waveguides.

The inventors have also recognized and appreciated that using a single layer of emitter elements (a "single emitting layer") that is separate from the layer of waveguides ("the waveguide layer"), up to 50% of the optical power may be lost due to light emission occurring in both an upward and downward direction. By including multiple emitting layers, the amount of optical power emitted in the desired direction can be increased to greater than 90%, and in some cases higher than 99%.

The inventors have further recognized that a light emitting optical device that is compact may need to overcome several obstacles that have not been addressed by conventional optical devices. For example, making a compact optical device may include using a phase shifters that are scalable to large arrays. For phase shifters to be considered scalable, the phase shifters should have approximately the same pitch as the emitter elements used to cause the light to be emitted from the optical device. Optical devices that include phase shifters that have approximately the same pitch as the emitter elements of the optical device may have large fill factors, where the fill factor is defined as the ratio of the light emitting/receiving area of the optical device to the total area of the optical device. As a result of including phase shifters that have approximately the same pitch as the emitter elements, the fill factor is less dependent on the number of antennas included as compared to optical devices that include phase shifters that have a larger pitch than the emitter elements.

The inventors have also recognized that the fill factor of an optical device can be further increased by forming the optical device using a "unit cell" approach where particular regions of the device are repeated in an array and stacked together in a "Tetris-style" building block approach. The optical device, for example, can include, on a top layer, multiple light-emitting regions in an antenna layer that are formed above multiple phase shifter regions in a phase shifter layer that is below the antenna layer. Each light-emitting region emits light from a phase shifter region from which light is received. A particular light-emitting region does not emit light from the phase shifter region immediately below the light-emitting region. Instead, a particular light-emitting region emits light from a phase shifter region that is in a different position in the array of regions such that the majority of the top layer of the optical device includes light-emitting regions. Thus, the surface area of the optical device is not wasted with regions that do not emit light. Instead, the phase shifter regions, which do not emit light, may be located beneath the antenna regions.

The inventors have further recognized that a light emitting optical device that is compact may include multiple waveguides in close proximity. When waveguides of an optical device are sufficiently close, there is cross-talk between waveguides where light from a first waveguide evanescently couples to a second waveguide and vice versa. Such cross-talk can make it difficult to control the light emitted from an optical device. The inventors have recognized and appreciated that by using waveguides that are phase mismatched, the crosstalk between waveguides can be reduced. Waveguides can be phase mismatched by ensuring that adjacent waveguides have different propagation constants for the wavelength of light that the waveguides are designed to guide. The inventors have also recognized and appreciated that emitter elements used to form an antenna for each waveguide can be formed in a way that compensates for the phase mismatch in the waveguides and results in emitted light that is coherent and emits in a single direction. For example, if the optical device include a grating antenna, the grating period of the grating antenna for a first waveguide with a first propagation constant can be selected to be different from the grating period of a second waveguide with a second propagation constant such that the overall angle of the emitted light is the same, while maintaining a phase mismatch for the light within the two waveguides. Techniques described herein for phase mismatching waveguides can be used for any adjacent waveguides of the optical device. For example, adjacent waveguides in a waveguide layer of an antenna layer of the optical device may be phase mismatched. Alternatively or additionally, adjacent waveguides in a phase shifter layer of the optical device may be phase mismatched. Alternatively or additionally, a waveguide in the antenna layer may be phase mismatched with a waveguide from the phase shifter layer of the optical device.

Overview of an Optical Device According to Some Embodiments

Referring to FIG. 1A, an optical device 1 may include an array of reticle fields 2, a plurality of electrodes 4 and a heat sink 6. The optical device 1 emits light from a top surface of each reticle field 2 based on electronic control signals received via the electrodes 4. The electrodes 4 also provide power and ground contacts for the components of the optical device 1. The heat sink 6 is located on the bottom of the optical device 1, on the opposite side of the optical device 1 from the light emitting top surface. The optical device 1 may, by way of example and not limitation, be an electronic-photonic 300 mm platform with 3D integrated complementary metal-oxide-semiconductor (CMOS) electronics for controlling phased array elements and other functions of the optical device 1. Additionally, the optical device 1 may use a "Unit-Cell" approach with "Tetris-Style" building blocks to achieve a high fill-factor (e.g., approaching 100%).

Each reticle field of the optical device 1 includes four macro-cells, each macro-cell including 16 unit cells (e.g., a 4×4 array that includes a unit cell 8 of FIG. 1). The unit cell 8 represents the lowest level of the modular approach for the optical device 1. Referring to FIG. 1B, each unit cell 10 may, for example, include a phase shifter region 12 in a phase shifter layer 18 and a light-emitting region 13 in an antenna layer 20, each region including multiple waveguides (not shown for the sake of clarity). Each phase shifter region 12 may include, by way of example and not limitation, 4096 phase shifters configured to shift the phase of light guided by the waveguides within the phase shifter region. Each light-emitting region 13 may include, 4096 grating antennas configured to perturb the light guided by the waveguides within the light-emitting region 13 and cause the light to be emitted from the top surface of the optical device 1. The phase shifters of the phase shifter region 12 are controlled by signals from the electrodes 4. For example, the phase shifters can be controlled to steer the light emitted from the top surface of the optical device 1.

Figure 1C:
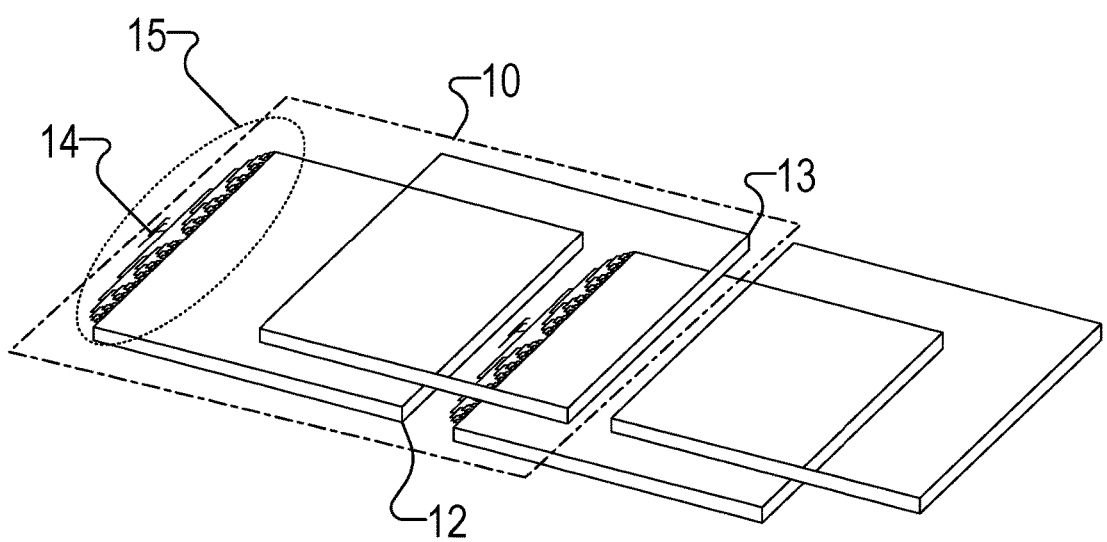
FIG. 1C is a perspective view of a portion of the optical device of FIG. 1A.
Figure 1D:
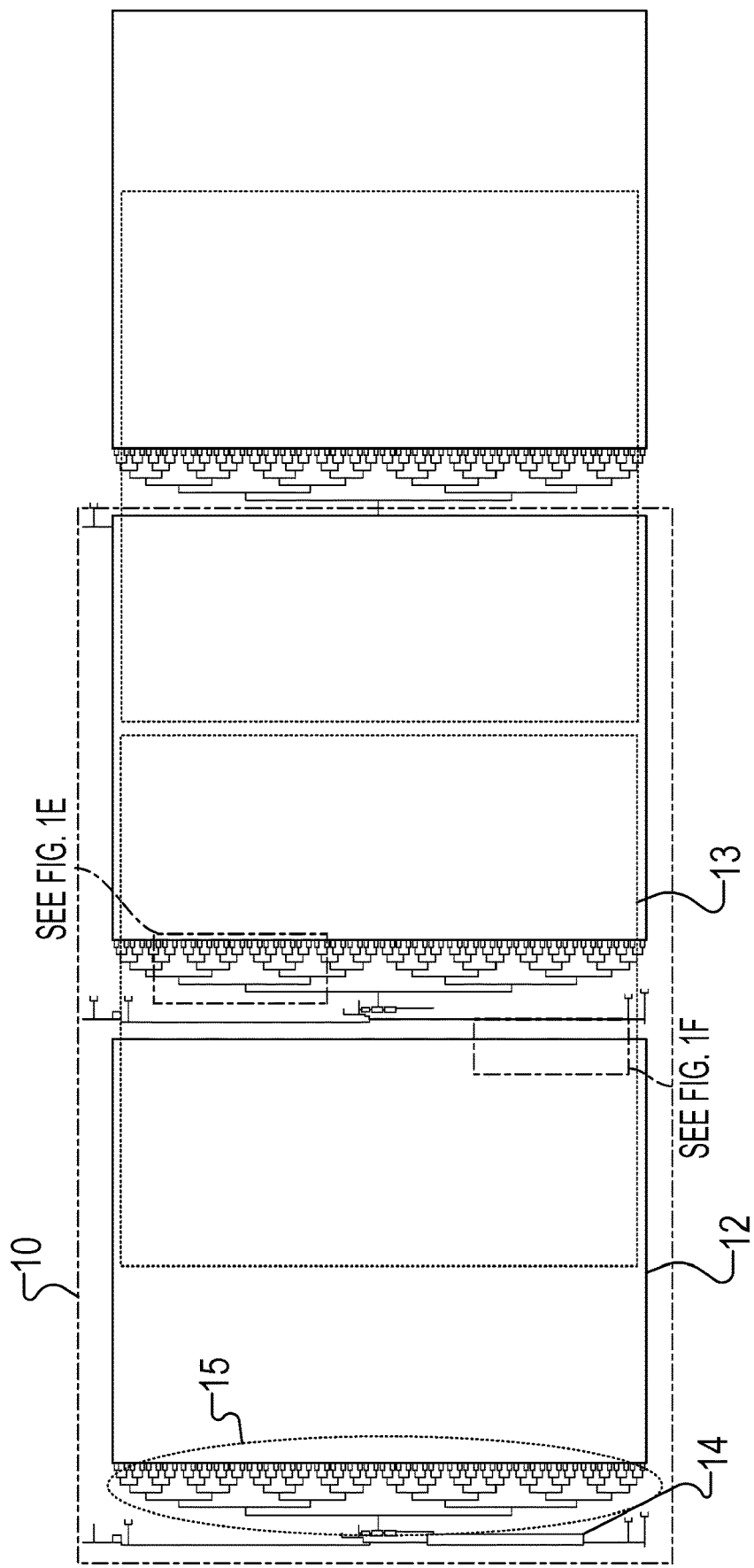
FIG. 1D is a top view of a portion of the optical device of FIG. 1A.

Referring to FIG. 1C and FIG. 1D, each unit cell 10 may further include a light source 14 and a splitting distribution network 15 for providing light from the light source 14 to each of the waveguides of the phase shifter region 12. The light source 14 may be a semiconductor laser that emits coherent light of a particular wavelength. Moreover, the light source 14 may be phase-locked with the light sources of other unit cells such that the light emitted from multiple light sources of the optical device 1 are coherent with one another. Additionally, the wavelength of the light source 14 may be tunable and may be adjusted using signals received via the electrodes 4. For example, the light emitted from the top surface of the optical device 1 can be steered by adjusting the wavelength of the light emitted by the light source 14. The light source 14 may be tuned, for example, by using a thermally-tuned external cavity. While the light source 14 is illustrated as part of the optical device 1, an external light source may be used and the light from the external light source may be coupled to the optical device using techniques known in the art. For example, an external light source may include a fiber that is butt-coupled to an initial waveguide of the splitting distribution network 15.

Figure 1E:
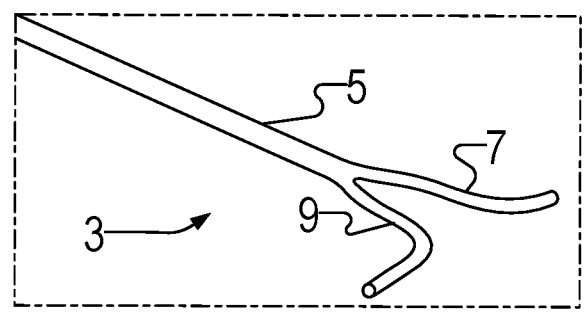
FIG. 1E is a perspective view of a waveguide splitter used in the optical device of FIG. 1A.
Figure 1F:
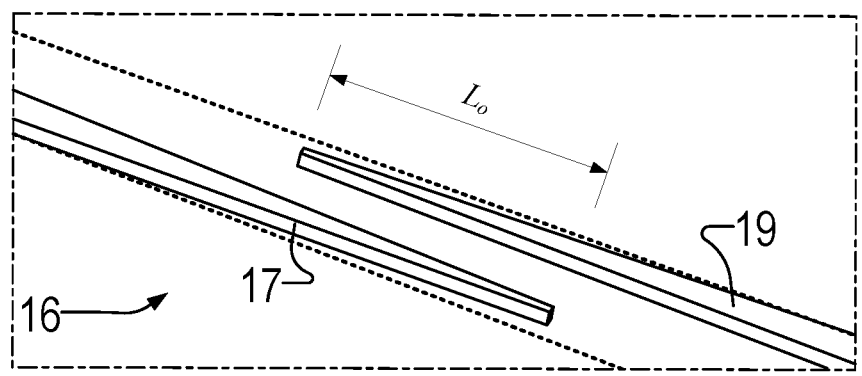
FIG. 1F is a perspective view of an optical escalator used in the optical device of FIG. 1A.

The splitting distribution network 15 may be, for example, a binary tree network or a star coupler that is optically connected to the light source 14 and each waveguide of the phase shifter region 12. A binary tree network may include a cascade of 1×2 couplers formed by splitting an initial waveguide that is connected to the light source 14 into two waveguide, each of those two waveguides splitting into two more waveguides, and so on until $2^n$ waveguides are formed, where n is the number of levels of the tree. Referring to FIG. 1E, a 1×2 coupler 3 of a binary tree network splits light from a single waveguide 5 into two separate waveguides 7 and 9. By splitting light from a coherent light source 14, the splitting distribution network 15 delivers light to each of the waveguides of the phase shifter region 12 that is coherent with the light received by every other waveguide of the phase shifter region 12. The splitting distribution network 15 may be located at the same level as the phase shifter region 12 or at a level below the phase shifter region 12.

The "Tetris-style" approach to an example optical device is illustrated by the unit cell 10, which includes the phase shifter region 12 and the light-emitting region 13 offset from one another in a longitudinal direction defined by the orientation of the waveguides with in the phase shifter region 12 and the light-emitting region 13. The different regions are disposed at different layers within the optical device 1. A phase shifter layer 18 of the optical device 1 includes an array of phase shifter regions (e.g., phase shifter region 12), each phase shifter region comprising a first plurality of waveguides and at least one phase shifter for at least a portion of the first plurality of waveguides. Each phase shifter region of the array of phase shifter regions is located at a respective position within the array of phase shifter regions. An antenna layer 20 of the optical device 1 is above or below the phase shifter layer 18. The antenna layer 20 includes an array of light-emitting regions (e.g., light-emitting region 13), each light-emitting region including a second plurality of waveguides. Each light-emitting region of the array of light-emitting regions is located at a respective position within the array of light-emitting regions. Additionally, each light-emitting region of the array of light-emitting regions is configured to emit light received from a phase shifter region located at a position adjacent to a position of the light-emitting region. For example, phase shifter region 12 is located at a position in the array that is one position to the left of the light-emitting region 13. In other words, the center of the phase shifter region 12 is to the left of the center of the light-emitting region 13. It should be understood, that the directional terms left and right are being used in reference to FIG. 1 and do not limit the directionality of embodiments of the optical device 1.

Figure 2A:
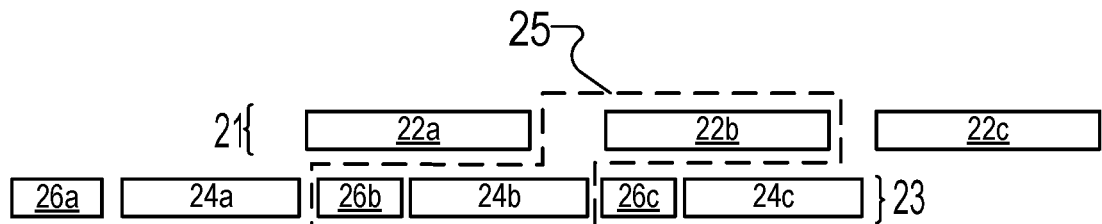
FIG. 2A is a block diagram of a cross-sectional view of a portion of an optical device with a distribution network at the same level as a phase shifter layer.
Figure 2B:
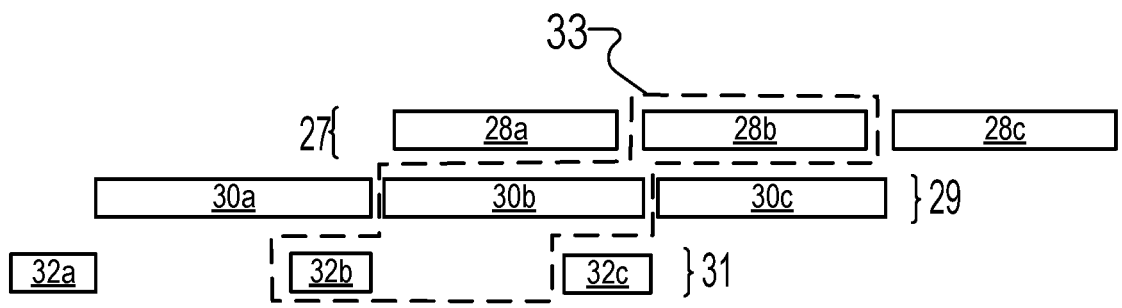
FIG. 2B is a block diagram of a cross-sectional view of a portion of an optical device with a distribution network at a level below a level of a phase shifter layer.
Figure 2C:
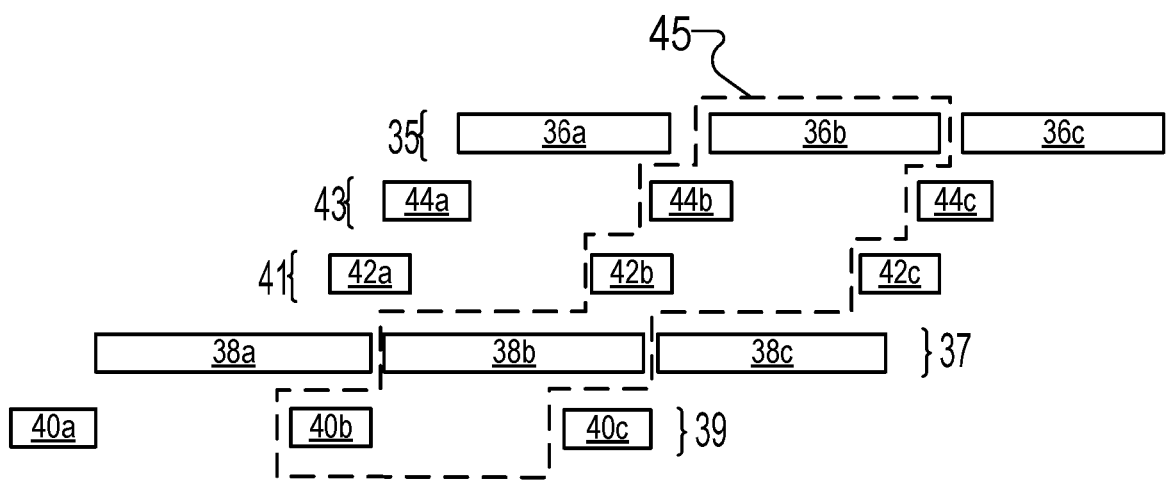
FIG. 2C is a block diagram of a cross-sectional view of a portion of an optical device with a distribution network at a level below a level of a phase shifter layer and multiple transition layers between the phase shifter layer and a light-emitting layer.

Referring to FIG. 2A, FIG. 2B and FIG. 2C, other arrangements of phase shifter regions and light-emitting regions are possible. For example, in FIG. 2A, an antenna layer 21 is located above a phase shifter layer 23. The antenna layer 21 includes three light-emitting regions 22*a-c* and the phase-shifter layer 23 includes three phase shifter regions 24*a-c*, though the number of regions in each layer is not limited to three. Multiple splitting distribution network regions 26*a-c* are located at the same depth level as the phase shifter layer 23. A unit cell 25 includes a splitting distribution region 26*b*, a phase shifter region 24*b*, and a light-emitting region 22*b*. The light-emitting region 22*b* is above the phase shifter region 24*c* of a different unit cell because the waveguides of the light-emitting region 22*b* receives light from the phase shifter region 24*b*, which is located at an adjacent position.

Referring to FIG. 2B, an antenna layer 27 is located above a phase shifter layer 29. The antenna layer 27 includes three light-emitting regions 28*a-c* and the phase-shifter layer 29 includes three phase shifter regions 30*a-c*, though the number of regions in each layer is not limited to three. Multiple splitting distribution network regions 32*a-c* are disposed in a splitting network layer 31 that is located at a depth level that is lower than the depth level of the phase shifter layer 23. Consequently, the phase shifter layer 29 is located at a depth level that is between the antenna layer 27 and the splitting network layer 31. A unit cell 33 includes a splitting distribution region 32*b*, a phase shifter region 30*b*, and a light-emitting region 28*b*. The light-emitting region 28*b* is above the phase shifter region 30*c* of a different unit cell because the waveguides of the light-emitting region 28*b* receives light from the phase shifter region 30*b*, which is located at an adjacent position.

Referring to FIG. 2C, an antenna layer 35 is located above a phase shifter layer 37. The antenna layer 35 includes three light-emitting regions 36*a-c* and the phase-shifter layer 29 includes three phase shifter regions 38*a-c*, though the number of regions in each layer is not limited to three. Multiple splitting distribution network regions 40*a-c* are disposed in a splitting network layer 39 that is located at a depth level that is lower than the depth level of the phase shifter layer 37. There are also two transition layers, a first transition layer 41 and a second transition layer 43. The transition layer 41 includes transition regions 42*a-c*, which each include a plurality of waveguides. The transition layer 43 also includes multiple transition regions 44*a-c*, which each include a plurality of waveguides. The transition regions provide optical isolation between the phase shifter layer 37 and the antenna 35 by vertically separating these layers in the depth direction such that waveguides in the phase shifter layer 37 do not directly optically couple with waveguides in the antenna layer 35. This prevents cross-talk between the layers. The waveguides in the first transition layer 41 receive light from waveguides in the phase shifter layer 37; the waveguides in the second transition layer 43 receive light from waveguides in the first transition layer 41; the waveguides of the antenna layer 35 receive light from the waveguides of the second transition layer 43. Consequently, the phase shifter layer 37 is located at a depth level that is between the antenna layer 35 and the splitting network layer 39, but the phase shifter layer 37 is separated from the antenna layer 35 by multiple transition layers. While two transition layers are illustrated in FIG. 2C, a single transition layer may be used or more than two transition layers may be used. A unit cell 45 includes a splitting distribution region 40*b*, a phase shifter region 38*b*, a first transition region 42*b*, a second transition region 44*b*, and a light-emitting region 36*b*. The light-emitting region 36*b* is above the phase shifter region 338*c* of a different unit cell because the waveguides of the light-emitting region 36*b* receives light, via the transition regions 42*b* and 44*b*, from the phase shifter region 38*b*, which is located at an adjacent position.

An optical layer transition is used to optically couple a waveguide from a first layer to a waveguide located in a second layer that is above or below the first layer. Non-limiting examples of optical layer transitions include an inverse taper element, a grating-to-grating coupler, or a periscope. The periscope includes an arrangement of at least two reflective surfaces that guide light from the waveguide of the first layer to the waveguide of the second layer using reflection. An example of an inverse taper element is an "optical escalator." Referring to FIG. 1F, an optical escalator 16 includes a first waveguide 17 at a first depth level and a second waveguide 18 at a second depth level. The first waveguide 17 is tapered such that the width of the first waveguide 17 decreases from a first width to a termination width at which the first waveguide 17 terminates. The second waveguide 18 is tapered in the opposite direction of the first waveguide 17 such that the width of the second waveguide 18 begins with an initial width and grows into a waveguide with a second width. The first waveguide 17 and the second waveguide 18 overlap vertically (in a depth direction) such that the second waveguide 18 is above the first waveguide 17, or vice versa, for an overlap length, $L_o$. The first waveguide 17 and the second waveguide 18 are parallel in at least a region where the two waveguides overlap. Light that is guided by the first waveguide 17 from the left to the right will adiabatically couple to the second waveguide 18 such that light that was originally guided at the first depth level will be raised to the second depth level, thus completing a transition between layers of the optical device.

Figure 3:
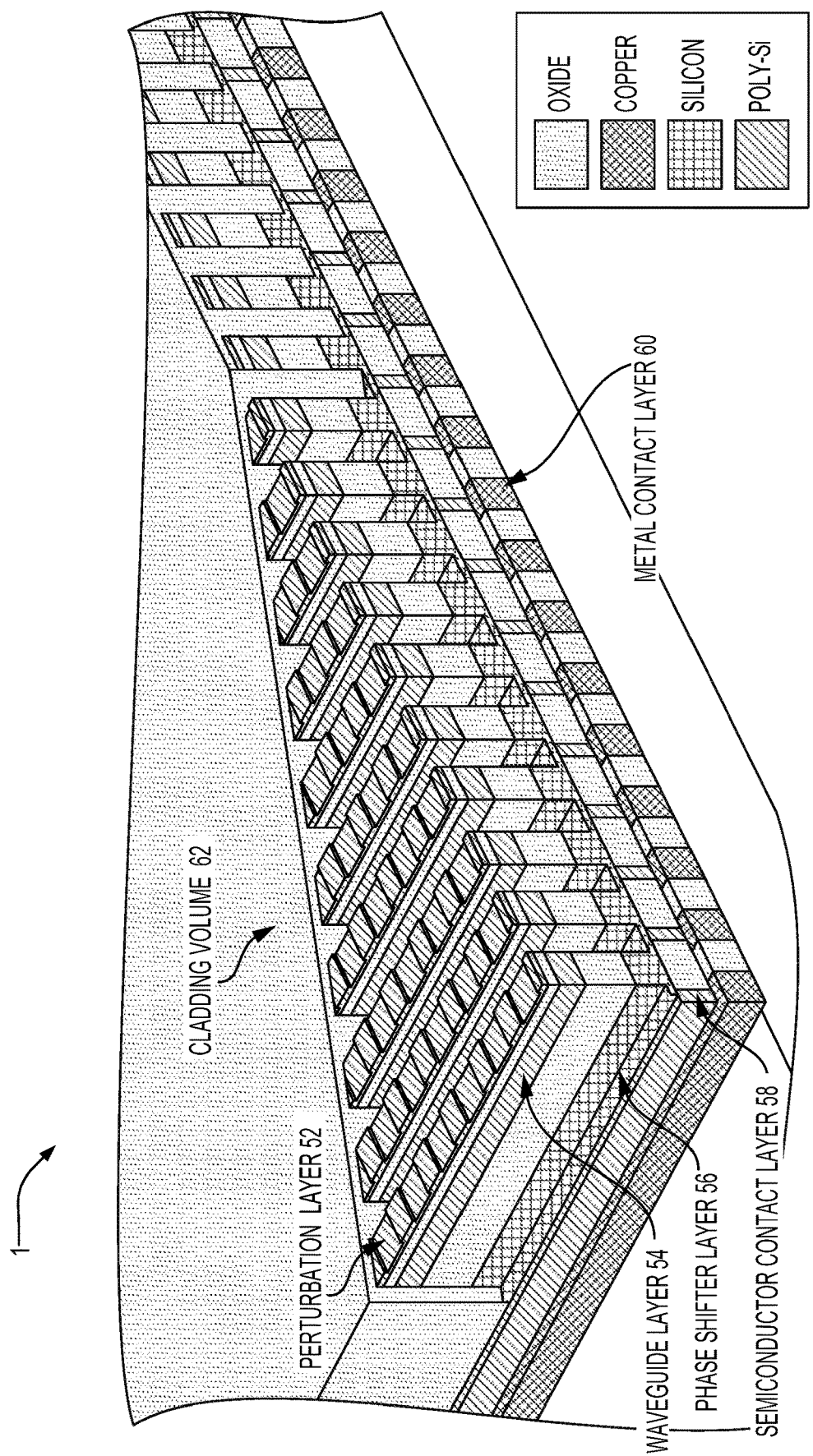
FIG. 3 is a perspective view of a cross-section of the optical device of FIG. 1A.
Figure 4:
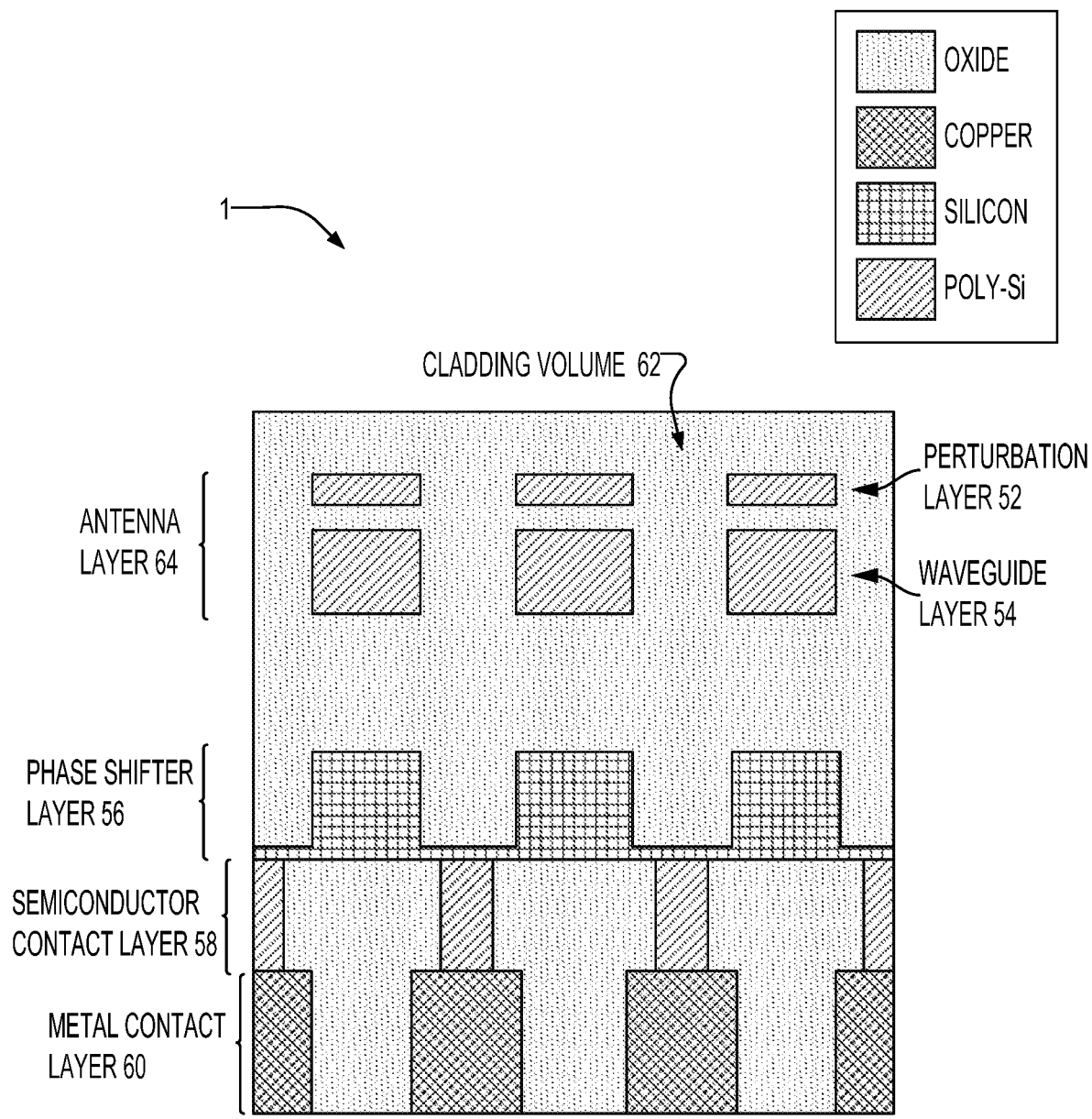
FIG. 4 is a cross-section view of the optical device of FIG. 1A.

Referring to FIG. 3 and FIG. 4, with further reference to FIGS. 1A-F, the optical device 1 is an integrated device that includes multiple layers, including a perturbation layer 52, a waveguide layer 54, a phase shifter layer 56, a semiconductor contact layer 58, and a metal contact layer 60. Each of the multiple layers may be formed using etching techniques, epitaxial growth techniques, deposition techniques and/or doping techniques. The perturbation layer 52 and the waveguide layer 54 may be collectively referred to as an antenna layer 64. The optical device 1 also includes a cladding volume 62 that acts as the cladding for the waveguides within the optical device 1. While FIGS. 3-4 illustrate grating antennas configured to emit light guided by the waveguide, other types of antennas may also be used in some embodiments. For example, plasmonic antennas, waveguide-termination antennas or resonant antennas may be used to emit light from waveguides of the optical device 1.

While the components of FIGS. 3-4 are illustrated as being formed of specific material, other materials may be used. The perturbation layer 52 is illustrated as being formed from poly-silicon. In other embodiments, however, the perturbation layer 52 may be formed from, by way of example and not limitation, intrinsic silicon, doped silicon, silicon nitride, liquid crystals, aluminum nitride, indium titanium oxide, a metal, or germanium. The waveguide layer 54 is illustrated as being formed from poly-silicon. In other embodiments however, the waveguide layer 54 may be formed from, by way of example and not limitation, intrinsic silicon, doped silicon, or silicon nitride. The phase shifter layer 56 is illustrated as being formed from silicon. In other embodiments, however, the phase shifter layer 56 may be formed from, by way of example and not limitation, a doped silicon, silicon-germanium, germanium, transparent conductive oxides (e.g. indium-tin-oxide, indium-gallium-zinc-oxide, indium-zinc-oxide, gallium-zinc-oxide, etc.), bismuth ferrite, vanadium oxide, graphene and liquid crystals. The semiconductor contact layer 58 is illustrated as being formed from poly-silicon. In other embodiments, however, the semiconductor contact layer 58 may be formed from, by way of example and not limitation, a d doped silicon, silicon-germanium, germanium, transparent conductive oxides, metal oxides (e.g. cupric-oxide (CuO)). The metal contact layer 60 is illustrated as being formed from copper. In other embodiments, however, the semiconductor contact layer 58 may be formed from, by way of example and not limitation, any conductive material such as other metals (gold, silver, titanium, aluminum, tungsten, tin, etc.), or carbon. Furthermore, while FIGS. 3-4 may illustrate two components as being formed from the same material, embodiments are not so limited. For example, the waveguide layer 54 and the perturbation layer 52 are both illustrated as being formed from poly-silicon. In other embodiments, however, the waveguide layer 54 may be formed from poly-silicon while the perturbation layer 52 is formed with a dielectric material that has a different index of refraction than silicon.

The phase shifter layer 56 includes multiple waveguide cores that, together with the cladding volume 62 form waveguides that guide light through the optical device 1. The metal contact layer 60 includes multiple metal contacts that deliver electrical signals from the electrodes 4 to multiple semiconductor contacts of the semiconductor contact layer 58. Each of the waveguides of the phase shifter layer 56 includes at least one phase shifter that, based on the received electrical signal, applies a phase shift along the waveguide such that light guided by a particular waveguide experiences a phase shift that depends on the received electrical signal. Each phase shifter of the phase shifter layer 56 may be independently controlled such that light guided by each waveguide of the phase shifter layer 56 experiences a phase shift that is individually controlled and may be different from the phase shifts experienced by other waveguides. Any type of phase shifter may be used to induce a phase shift along the waveguides of the phase shifter layer 56, including thermal phase shifters and electro-optical phase shifters. A particular example of an electro-optical phase shifter is described in more detail below.

The waveguide layer 54 includes multiple waveguides, which may be referred to as antenna waveguides to distinguish them from phase the phase shifter waveguides of the phase shifter layer 56. Light from the phase shifter layer 56 is coupled to the antenna waveguides of the waveguide layer 54 using an optical layer transition, such as the escalator 16. The perturbation layer 52 includes multiple antennas that cause light guided by the antenna waveguides to be emitted in a vertical direction, away from the phase shifter layer 56. While not illustrated in FIGS. 3-4, the perturbation layer 52 may include one or more emitter layers located above the waveguide layer 54. Each emitter layer may include multiple antennas. By way of example, the antennas may be a grating antenna that include multiple individual emitter elements along the length of the waveguide. In some embodiments, the antennas may be part of the waveguide layer 54 itself by partially etching or fully etching the emitter elements into the waveguide cores of the waveguide layer 54. Alternatively, as shown in FIGS. 3-4, the antennas are included in the perturbation layer 52, which is separate from the waveguide layer 54.

Having described an overview of an optical device according to some embodiments, particular details of example optical devices are described below.

Phase Mismatched Waveguides

When two or more waveguide cores are brought sufficiently close to one another, light guided by one waveguide may couple to a different waveguide. This crosstalk can limit the ability to precisely tune optical devices that emit optical radiation for purposes such as LIDAR. To reduce crosstalk from occurring, adjacent waveguides can be phase mismatched from one another. Two waveguides are phase mismatched, for example, when the propagation constants of the two waveguides are different. The maximum optical power that is transferred between two neighboring guides is $$P_c \propto \left(\frac{\kappa}{\Delta\beta}\right)^2,$$

where κ is a coupling coefficient between the two waveguides and Δβ is the different in propagation constants between the two waveguides. Thus, a large Δβ prevents significant coupling of light between the two guides.

The propagation constant of a waveguide depends on the effective index of refraction of the waveguide via the following equation:

$$\beta = \frac{2\pi n_{\mathit{eff}}}{\lambda}, \quad \text{(Eqn. 1)}$$

where β is the propagation constant, $n_{\mathit{eff}}$ is the effective index of refraction, and λ is the wavelength of the light guided by the waveguide. The effective index of refraction, $n_{\mathit{eff}}$, is dependent on a number of parameters, including a cross-sectional area and the cross-sectional shape of the waveguide, a material that forms the waveguide core, and a material that forms the waveguide cladding. For example, increasing the width of the waveguide core increases the effective index of refraction, resulting in an increased propagation constant. Similarly, increasing the height of the waveguide core increases the effective index of refraction, resulting in an increased propagation constant. Using a material with a larger intrinsic index of refraction (e.g., the index of refraction of the bulk material) also increases the propagation constant.

Based on the waveguide above factors that affect the index of refraction, an entire array of waveguides can be phase mismatched by ensuring that adjacent waveguides in the array of waveguides are phase mismatched with each other. This may be achieved by forming each waveguide in the array with its own unique propagation constant. Alternatively, two, three or more types of waveguides can be used, each type having its own propagation constant. The array of waveguides can be formed by alternating the multiple different types of waveguides, e.g., periodically, to form the array.

Figure 5A:
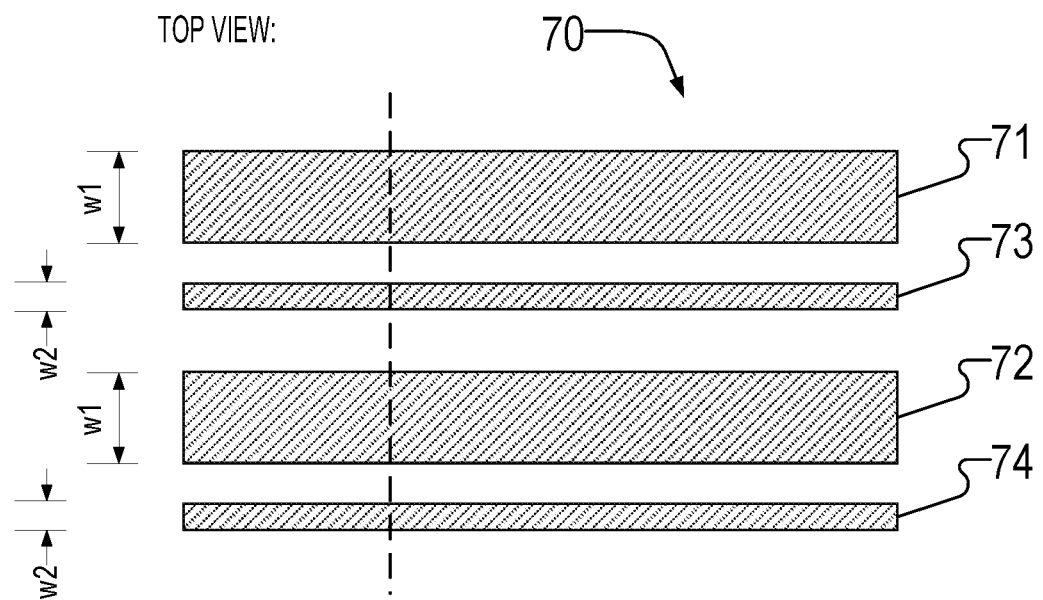
FIG. 5A is a top view of a waveguide array with alternating widths.
Figure 5B:
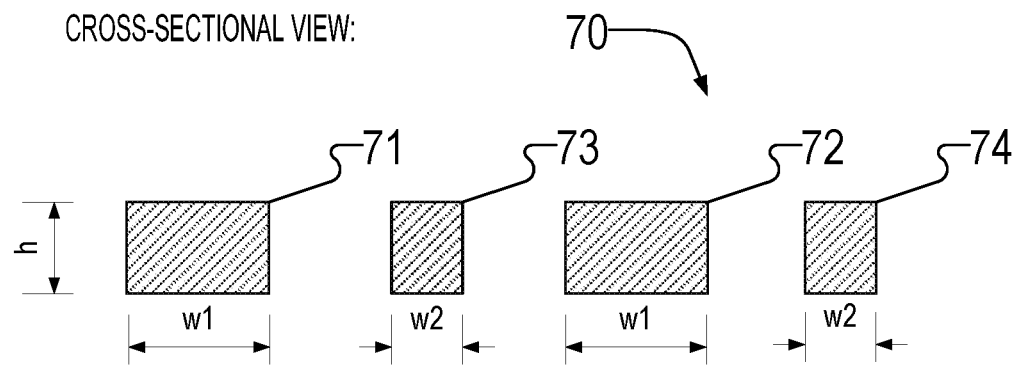
FIG. 5B is a cross-sectional view of a waveguide array with alternating widths.

Referring to FIG. 5A and FIG. 5B, a waveguide array 70 includes multiple waveguide cores 71-74. The dashed line of FIG. 5A illustrates the cross-sectional plane used to form the cross-sectional view of FIG. 5B. The waveguide cladding and other components are not shown, for reasons of clarity. While only four waveguide cores 71-74 are illustrated, any number of waveguide cores may be used, e.g., dozens, hundreds, or thousands of waveguide cores may form an array. The waveguide cores 71-72 are a first type of waveguide core with a first cross-sectional area and the waveguide cores 73-74 are a second type of waveguide core with a second cross-sectional area. The waveguide cores 71-72 have a first width, $w_1$, and the waveguide cores 73-74 have a second width, $w_2$. The two types of waveguide cores have the same height, h, and are formed from the same material. As discussed above, because the two types of waveguide cores have different widths, the propagation constants of the two types of waveguides are different resulting in different propagation constants. Thus, every waveguide of the array 70 is phase mismatched with an adjacent waveguide of the array 70.

Figure 6A:
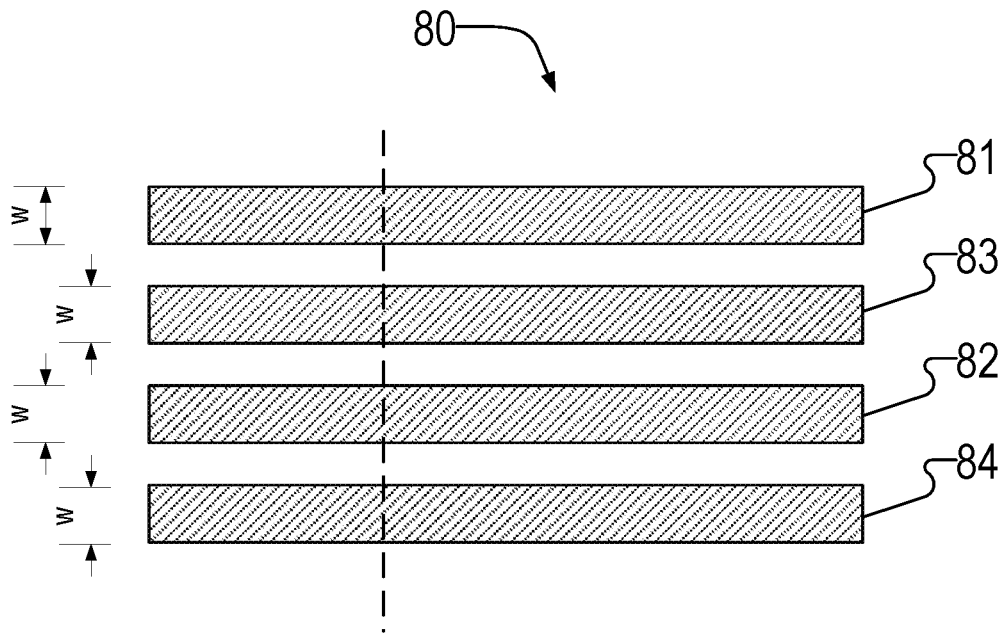
FIG. 6A is a top view of a waveguide array with alternating heights.
Figure 6B:
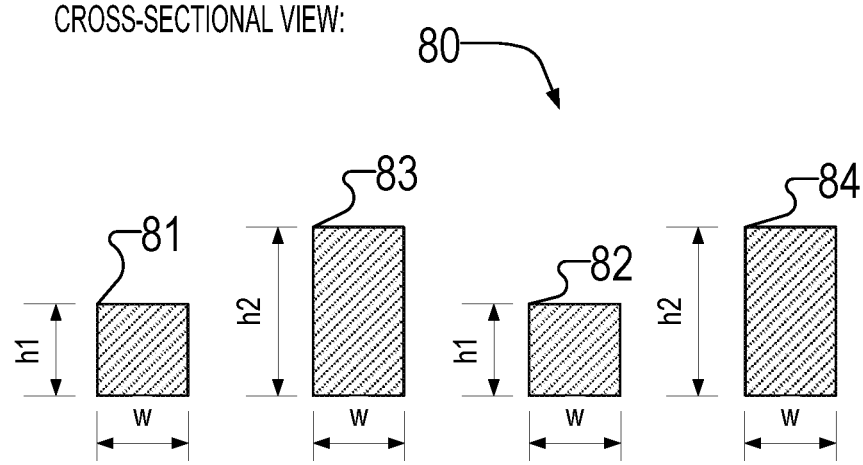
FIG. 6B is a cross-sectional view of a waveguide array with alternating heights.

Referring to FIG. 6A and FIG. 6B, a waveguide array 80 includes multiple waveguide cores 81-84. The dashed line of FIG. 6A illustrates the cross-sectional plane used to form the cross-sectional view of FIG. 6B. The waveguide cladding and other components are not shown, for reasons of clarity. While only four waveguide cores 81-84 are illustrated, any number of waveguide cores may be used, e.g., dozens, hundreds, or thousands of waveguide cores may form an array. The waveguide cores 81-82 are a first type of waveguide core with a first cross-sectional area and the waveguide cores 83-84 are a second type of waveguide core with a second cross-sectional area. The waveguide cores 81-82 have a first height $h_1$, and the waveguide cores 83-84 have a second width, $h_2$. The two types of waveguide cores have the same width, w, and are formed from the same material. As discussed above, because the two types of waveguide cores have different heights, the propagation constants of the two types of waveguides are different resulting in different propagation constants. Thus, every waveguide of the array 80 is phase mismatched with an adjacent waveguide of the array 80.

Figure 7A:
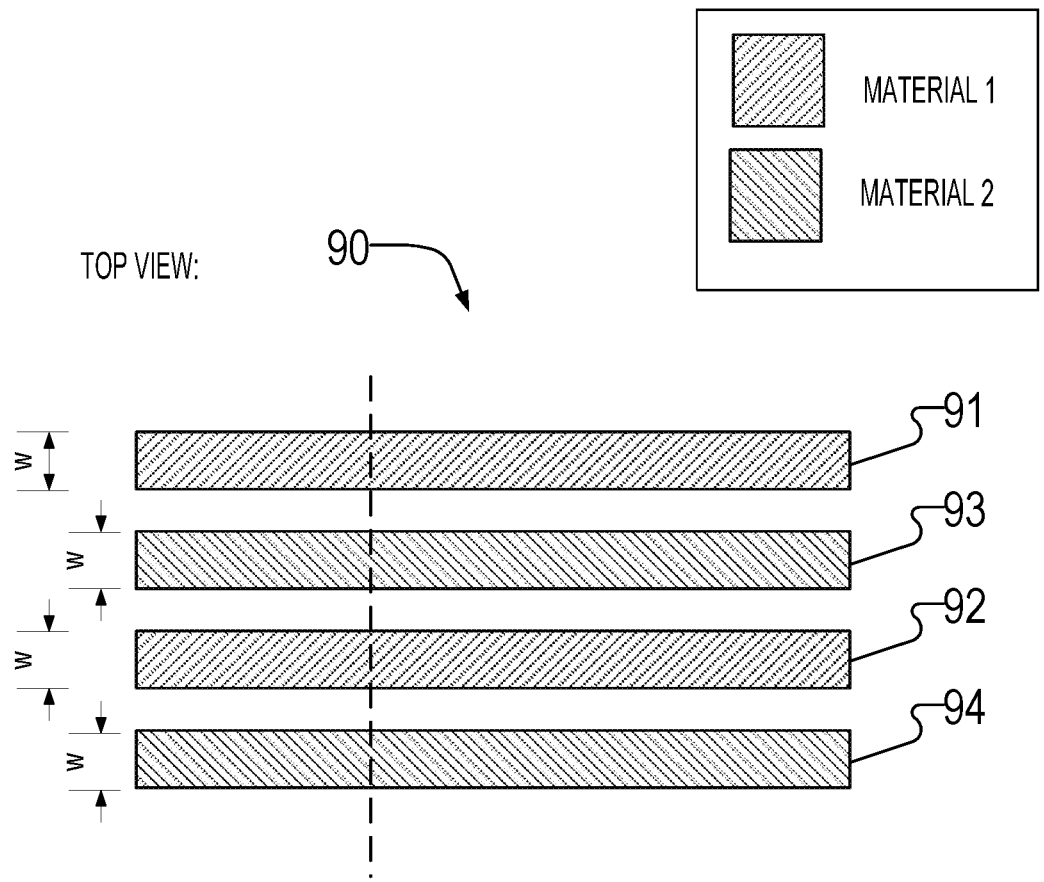
FIG. 7A is a top view of a waveguide array with alternating materials.
Figure 7B:
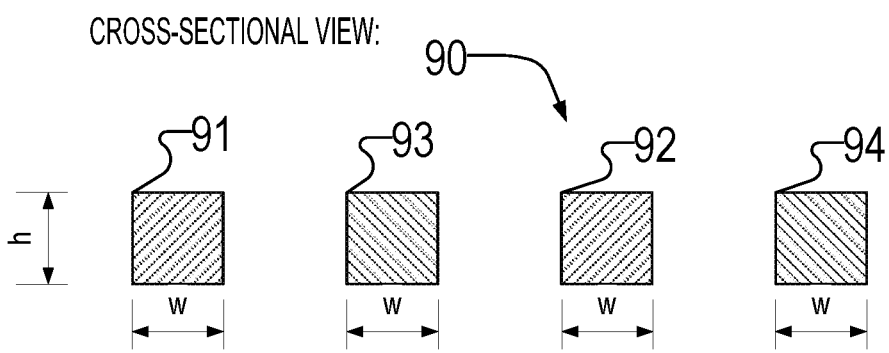
FIG. 7B is a cross-sectional view of a waveguide array with alternating materials.

Referring to FIG. 7A and FIG. 7B, a waveguide array 90 includes multiple waveguide cores 91-94. The dashed line of FIG. 7A illustrates the cross-sectional plane used to form the cross-sectional view of FIG. 7B. The waveguide cladding and other components are not shown, for reasons of clarity. While only four waveguide cores 91-94 are illustrated, any number of waveguide cores may be used, e.g., dozens, hundreds, or thousands of waveguide cores may form an array. The waveguide cores 91-92 are a first type of waveguide core formed from a first material and the waveguide cores 93-94 are a second type of waveguide core with a second material. The waveguide cores 91-92 have the same cross-sectional areas, height, h, and width, w, as the waveguide cores 93-94. For the purposes of phase mismatching, different materials means materials with different intrinsic indices of refraction for a particular polarization and wavelength of light. As discussed above, because the two types of waveguide cores are formed from different materials, the propagation constants of the two types of waveguides are different resulting in different propagation constants. Thus, every waveguide of the array 90 is phase mismatched with an adjacent waveguide of the array 90.

Figure 8A:
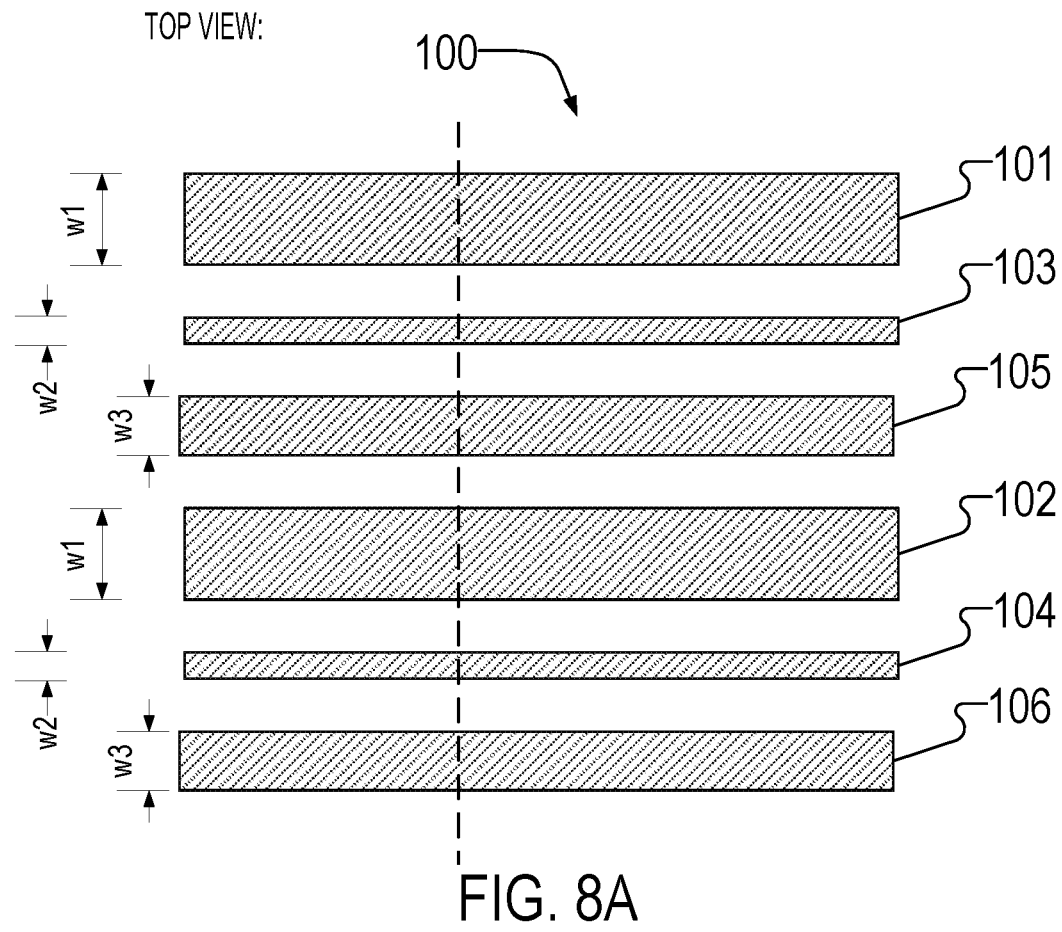
FIG. 8A is a top view of a waveguide array with alternating widths.
Figure 8B:
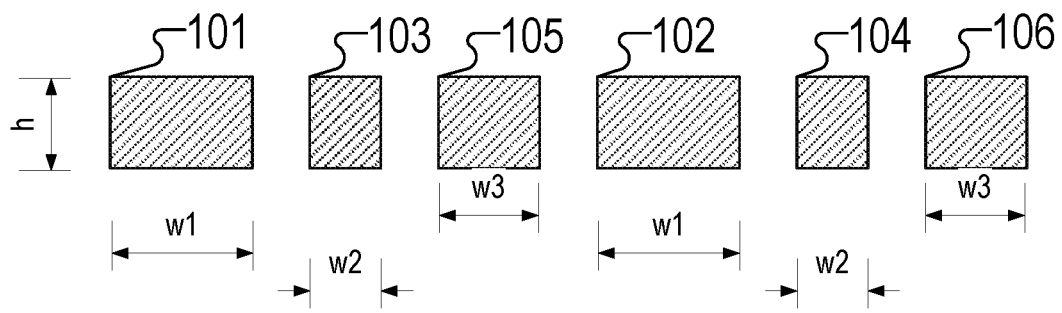
FIG. 8B is a cross-sectional view of a waveguide array with alternating widths.

The above examples of waveguide arrays used two different types of waveguides in an alternating pattern to create an array of phase mismatched waveguides. It is possible to create similar arrays of phase mismatched waveguides using more than two types of waveguides. Referring to FIG. 8A and FIG. 8B, a waveguide array 100 includes multiple waveguide cores 101-106 using three different types of waveguides. The dashed line of FIG. 8A illustrates the cross-sectional plane used to form the cross-sectional view of FIG. 8B. The waveguide cladding and other components are not shown, for reasons of clarity. While only six waveguide cores 101-106 are illustrated, any number of waveguide cores may be used, e.g., dozens, hundreds, or thousands of waveguide cores may form an array. The waveguide cores 101-102 are a first type of waveguide core with a first cross-sectional area, the waveguide cores 103-104 are a second type of waveguide core with a second cross-sectional area, and the waveguide cores 105-106 are a third type of waveguide core with a third cross-sectional area. The waveguide cores 101-102 have a first width, $w_1$, and the waveguide cores 103-104 have a second width, $w_2$, and the waveguide cores 105-106 have a third width, $w_3$. The three types of waveguide cores have the same height, h, and are formed from the same material. As discussed above, because the three types of waveguide cores have different widths, the propagation constants of the three types of waveguides are different resulting in different propagation constants. Thus, every waveguide of the array 100 is phase mismatched with an adjacent waveguide of the array 100. In this example, and in every embodiment using three or more alternating types of waveguides, each waveguide of the array (except for the waveguides at either end of the array) is adjacent to two different types of waveguides. For example, in array 100, waveguide 103 is adjacent to waveguide 101 with the first width and is also adjacent to waveguide 104 with the second width.

While FIG. 8A and FIG. 8B illustrate an alternating array of three types of waveguides with different widths, the same type of alternating array can be formed from waveguides with different heights and/or different materials. Additionally, the above techniques for forming phase mismatched waveguide arrays can be used individually, as described in connection with FIGS. 5A-7B, or the techniques may be combined to form waveguides of different propagation constants. For example, a first type of waveguide with a first propagation constant may have a different width, height and material from a second type of waveguide with a second propagation constant. Furthermore, embodiments are not limited to the aforementioned techniques for ensuring that two adjacent waveguides are phase mismatched. Any difference in the waveguides that causes the propagation constant to be different from a neighboring propagation constant may be used.

The above mentioned techniques for phase mismatching waveguides, as described in connection with FIGS. 5A-8B, use a propagation constant that is uniform throughout the entire length of each waveguide of an array. However, in some embodiments, the propagation constant of each waveguide may vary over the length of the waveguide. For example, the propagation constant of a particular waveguide may have a different value at each position along the length of the waveguide such that the propagation constant may be represented as a function of the position along the length of the waveguide. In some embodiments, the propagation constant can vary similar to a stepwise function, where the waveguide includes multiple sections where the propagation constant is uniform for the length of each section and each section is connected to an adjacent section using a taper. A taper is a portion of waveguide where the length changes from a first width to a second width over a distance that is less than the length of each section. In such an embodiment, the propagation constant varies over the length of the waveguide in a discontinuous manner, alternating from a first uniform propagation constant to a second uniform propagation constant. In another embodiment, a propagation constant varies smoothly over a length of a waveguide such that there are no discontinuities in the value of the propagation constant. The propagation constant may increase or decrease over the entire length of the waveguide such that the width of a particular waveguide is always either increasing or decreasing throughout the length of the waveguide. Alternatively, the propagation constant may alternate between increasing and decreasing over the length of the waveguide.

Figure 9A:
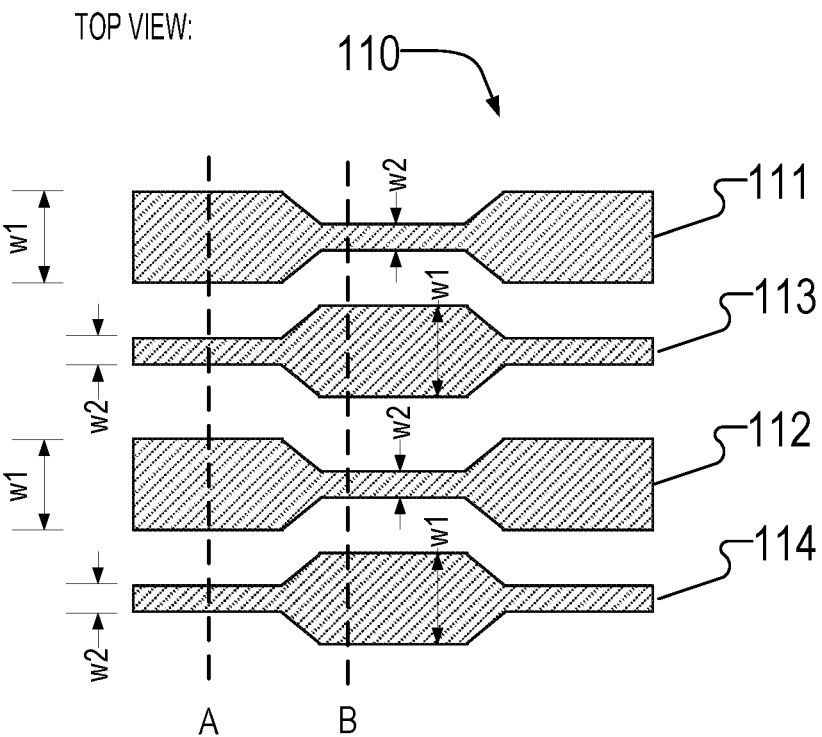
FIG. 9A is a top view of a waveguide array with widths that change discontinuously along the length of the waveguides.
Figure 9B:
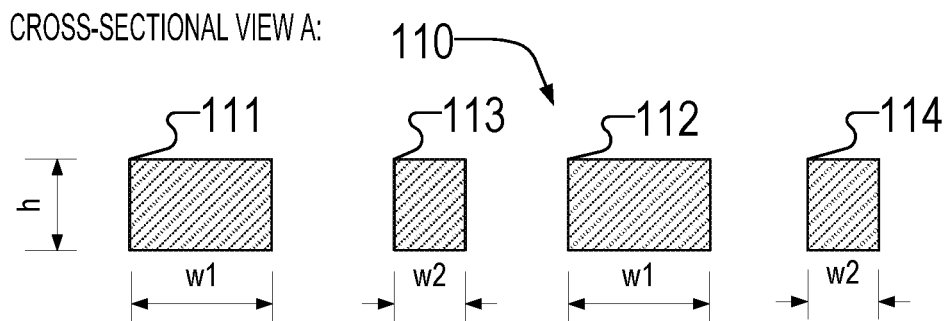
FIG. 9B is a first cross-sectional view of a waveguide array with widths that change discontinuously along the length of the waveguides.
Figure 9C:
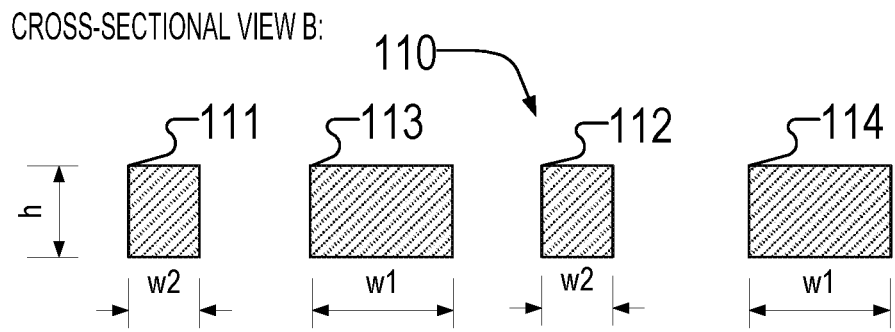
FIG. 9C is a second cross-sectional view of a waveguide array with widths that change discontinuously along the length of the waveguides.

Referring to FIGS. 9A-C, a waveguide array 110 includes multiple waveguide cores 111-114. The dashed line A of FIG. 9A illustrates the cross-sectional plane used to form the cross-sectional view of FIG. 9B, and the dashed line B of FIG. 9A illustrates the cross-sectional plane used to form the cross-sectional view of FIG. 9C. The waveguide cladding and other components are not shown, for reasons of clarity. While only four waveguide cores 111-114 are illustrated, any number of waveguide cores may be used, e.g., dozens, hundreds, or thousands of waveguide cores may form an array. The waveguide cores 111-112 are a first type of waveguide core with a width that varies periodically and discontinuously from a first width, $w_1$, to a second width, $w_2$. The waveguide cores 113-114 are a second type of waveguide core with a width that varies periodically and discontinuously from the second width, $w_2$, to the first width, $w_1$. The waveguide cores 111-114 have a periodically varying width over the lengths of the waveguides. In a first section of the waveguides formed from the waveguide cores 111-112, the waveguides have a first uniform propagation constant that is based on the first width, $w_1$, of the waveguide cores 111-112. In a second section of the waveguides formed from the waveguide cores 111-112, the waveguides have a second uniform propagation constant that is based on the second width, $w_2$, of the waveguide cores 111-112. The two sections of the waveguide cores 111-112 with uniform, but different, widths (and therefore uniform, but different, propagation constants) are connected via a taper that varies from the first width, $w_1$, to the second width, $w_2$. Similarly, in a first section of the waveguides formed from the waveguide cores 113-114, the waveguides have the second uniform propagation constant that is based on the second width, $w_2$, of the waveguide cores 113-114. In a second section of the waveguides formed from the waveguide cores 113-114, the waveguides have a second uniform propagation constant that is based on the first width, $w_1$, of the waveguide cores 113-114. The two sections of the waveguide cores 113-114 with uniform, but different, widths (and therefore uniform, but different, propagation constants) are connected via a taper that varies from the second width, $w_2$ to the first width, $w_1$. As discussed above, because the two types of waveguide cores have different widths at each location along the waveguides, the propagation constants of the two types of waveguides are different resulting in different propagation constants at each location along the waveguides. Thus, every waveguide of the array 110 is phase mismatched with an adjacent waveguide of the array 110.

Figure 10A:
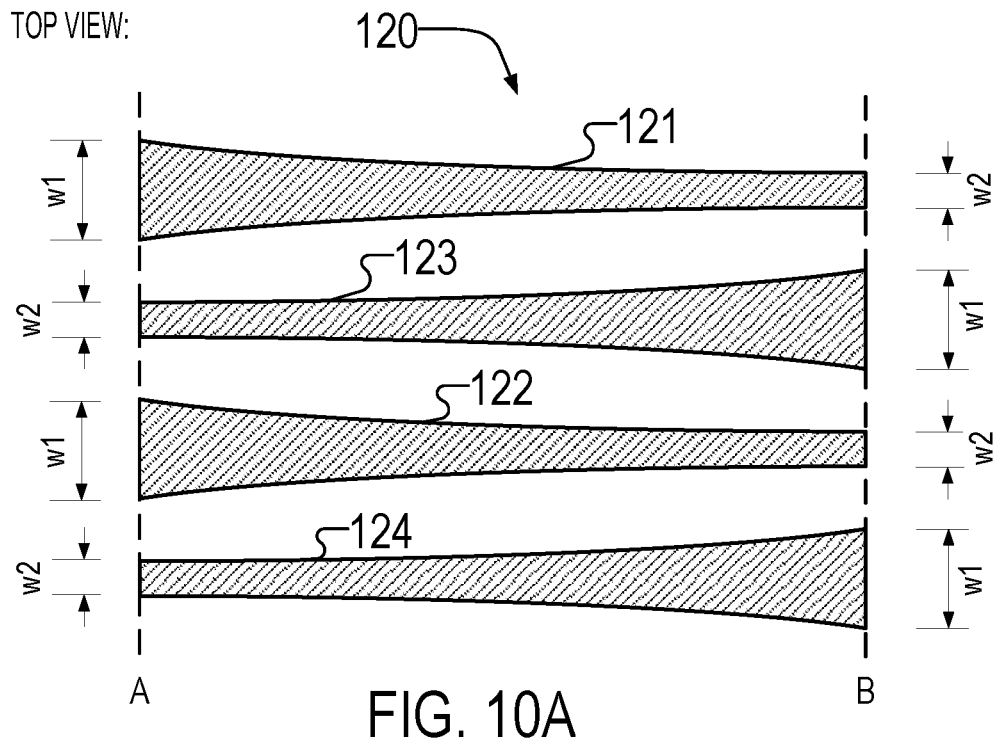
FIG. 10A is a top view of a waveguide array with widths that change smoothly along the length of the waveguides.
Figure 10B:
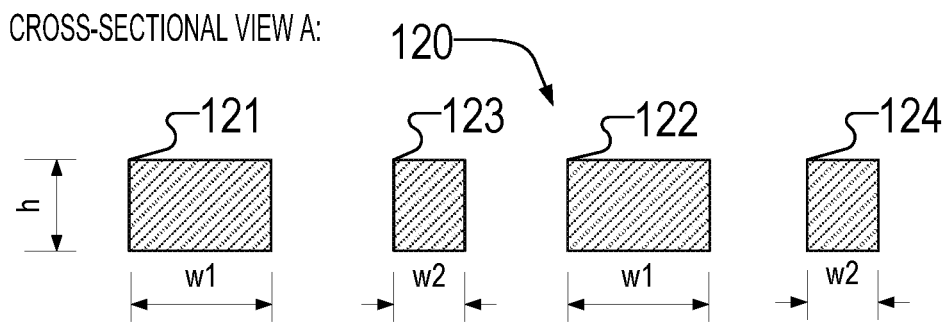
FIG. 10B is a first cross-sectional view of a waveguide array with widths that change smoothly along the length of the waveguides.
Figure 10C:
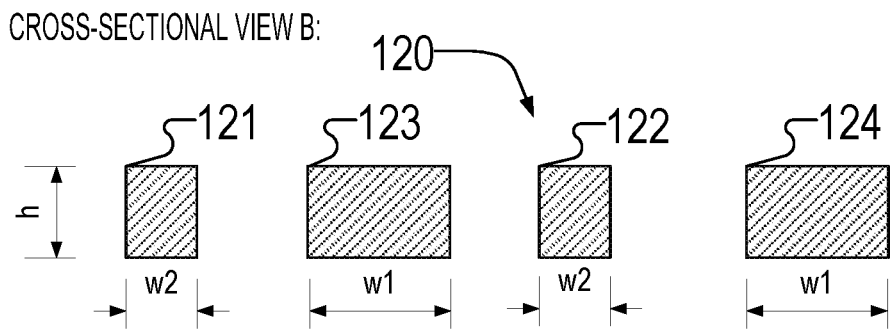
FIG. 10C is a second cross-sectional view of a waveguide array with widths that change smoothly along the length of the waveguides.

Referring to FIGS. 10A-C, a waveguide array 120 includes multiple waveguide cores 121-124. The dashed line A of FIG. 10A illustrates the cross-sectional plane used to form the cross-sectional view of FIG. 10B, and the dashed line B of FIG. 10A illustrates the cross-sectional plane used to form the cross-sectional view of FIG. 10C. The waveguide cladding and other components are not shown, for reasons of clarity. While only four waveguide cores 121-124 are illustrated, any number of waveguide cores may be used, e.g., dozens, hundreds, or thousands of waveguide cores may form an array. The waveguide cores 121-122 are a first type of waveguide core with a width that varies smoothly and continuously from a first width, $w_1$, to a second width, $w_2$. The waveguide cores 123-124 are a second type of waveguide core with a width that varies smoothly and continuously from the second width, $w_2$, to the first width, $w_1$. As discussed above, because the two types of waveguide cores have different widths at most locations along the waveguides, the propagation constants of the two types of waveguides are different resulting in different propagation constants at most locations along the waveguides. There is one location where the widths of the two types of waveguide cores are equal, but the proportion of the waveguide where the widths are equal is small relative to the lengths of the waveguides for which the waveguides have different widths. Thus, every waveguide of the array 120 is phase mismatched with an adjacent waveguide of the array 120. In some embodiments, the widths of the two types of waveguides may be different for 75% of the length of the waveguides, 90% of the length of the waveguides, 95% of the length of the waveguides or 99% of the length of the waveguides.

The aforementioned waveguide mismatching techniques may be used in any array of waveguides of an optical device. For example, referring back to FIGS. 3-4, the waveguides in the waveguide layer 54 and/or the waveguides in the phase shifter layer 56 may be phase mismatched. Additionally, the phase mismatching techniques may be applied to waveguides in different layers. For example, a first waveguide in the waveguide layer 54 may be phase mismatched from a second waveguide in the phase shifter layer 56 that is adjacent to the first waveguide in a depth direction (e.g., the first waveguide is vertically above the second waveguide).

In some embodiments, it may be desirable to have the total optical path of a first type of waveguide equal to the total optical path of a second type of waveguide. This may be desirable, for example, when the phase mismatching techniques are used for phase shifter waveguides. In this type of embodiment, the overall phase shift imparted on light guided by the waveguides by the geometry of the two types of waveguides should be equal to ensure the phase shift imparted on the light is controlled precisely by the phase shifters themselves.

Compensating for Phase Mismatch with the Perturbation Layer

An optical device that emits light from an array of waveguides may include multiple antennas that combine and superpose the light from each waveguide of the array of waveguides, enhancing radiation in certain directions while suppressing radiation in other directions. Using multiple antennas in this way creates a radiation pattern that could not be achieved by a single antenna.

When the aforementioned phase mismatching technique is used to form a waveguide array with adjacent waveguides having different propagation constants, a problem arises in ensuring that the direction of emission from a one waveguide is the same as the direction of emission from another waveguide with a different propagation constant. For example, the direction of emission for a grating antenna depends on the propagation constant of the waveguide. Thus, a large difference in propagation constant between neighboring waveguides of the array causes the emitted light from the optical device to become out of phase. This phase mismatch in the emitted light can be compensated by adjusting the grating period of the grating antenna used for each waveguide. Specifically, if the propagation constant vector of a first waveguide is $\vec{\beta}_1$ and the propagation constant vector of a second waveguide is $\vec{\beta}_2$ (both of the propagation constant vectors directed toward the direction of propagation), then the difference in propagation constant vectors is $\Delta\vec{\beta} = \vec{\beta}_2 - \vec{\beta}_1$. Further, if a grating antenna for the first waveguide has a first grating wavenumber vector $\vec{K}_1$ and a grating antenna for the second waveguide has a second grating wavenumber vector $\vec{K}_2$, then the difference in grating wavenumber vectros between the two grating antennas is $\Delta\vec{K}=\vec{K}_2-\vec{K}_1$. The amplitude of the grating wavenumber vector of a grating antenna is $|\vec{K}|=2\pi/\Lambda$, where $\Lambda$ is the grating period of the grating antenna and the direction of the vector is against the direction of propagation of light in the grating (i.e., in the opposite direction as the propagation constant vector). For the emitted light from the two waveguides to be emitted at the same angle, the grating period of the grating antennas should be adjusted such that $\Delta\vec{K}=-\Delta\vec{\beta}$. In other words, the following equation should be satisfied:

$$\vec{\beta}_1 + \vec{K}_1 = \vec{\beta}_2 + \vec{K}_2. \quad \text{(Eqn. 2)}$$

The wavenumber vectors $\vec{K}_2$ and $\vec{K}_2$ point in the opposite direction as the propagation constant vectors $\vec{\beta}_1$ and $\vec{\beta}_2$. As a result, if the widths of the waveguide cores are used to control the propagation constants of two neighboring waveguides, then the wider of the two waveguides has the larger propagation constant and, therefore, the grating antenna associated with the wider waveguide should have a smaller grating period.

As mentioned above, the propagation constant of a particular waveguide is dependent on the wavelength of the light guided by the waveguide. Equation 2, above, should be satisfied for first light guided by a first waveguide and second light guided by a second waveguide for the grating antennas associated with the two waveguides to emit light in the same direction. To emphasize the wavelength dependence of Eqn. 2, it can be rewritten in scalar form as:

$$\frac{2\pi n_1(\lambda)}{\lambda} - \frac{2\pi}{\Lambda_1} = \frac{2\pi n_2(\lambda)}{\lambda} - \frac{2\pi}{\Lambda_2}, \quad \text{(Eqn. 3)}$$

where $n_1(\lambda)$ is the wavelength dependent effective index of refraction of the first waveguide, $n_2(\lambda)$ is the wavelength dependent effective index of refraction of the second waveguide, $\Lambda_1$ is the grating period of the first grating antenna, and $\Lambda_2$ is the grating period of the second grating antenna. If $\lambda_p$ is defined as the wavelength at which both the first waveguide and the second waveguide are configured to emit the light perpendicularly, $|\vec{K}_1|=2\pi/\Lambda_1$ and $|\vec{K}_2|=2\pi/\Lambda_2$ can be written as $2\pi n_{1,2}(\lambda_p)/\lambda_p$ (known as the Bragg condition). Thus, the Eqn. 3 can be further rewritten as:

$$\frac{n_1(\lambda)}{\lambda} - \frac{n_1(\lambda_p)}{\lambda_p} = \frac{n_2(\lambda)}{\lambda} - \frac{n_2(\lambda_p)}{\lambda_p}. \quad \text{(Eqn. 4)}$$

In some embodiments, Eqn. 4 is satisfied for the wavelengths of light ($\lambda$) for which the optical device is operational. The period of each grating antenna may be set, for example, so that the emitted light from a first emitter element of a particular grating antenna is in phase with the light emitted from a second emitter element (adjacent to the first emitter element in the particular grating antenna along a waveguide) for the operational wavelength. Further, the emission angle from the first emitter element may also be equal with the emission angle of the second emitter element. Additionally, at the operational wavelength, the emission angles from adjacent antennas may be equal.

Grating antennas are formed in a perturbation layer and includes multiple emitter elements spaced at a periodic interval (i.e., the grating period). The emitter elements may be made from the same material as the associated waveguide core or from a different material. The material may be a dielectric, a semiconductor, or a metal. The grating antennas are configured to emit light from an associated waveguide. In some embodiments, the perturbation layer may be part of the same layer as the waveguide layer by being partially or fully etched into the waveguide core itself. Alternatively or additionally, the perturbation layer may be above or below the waveguide layer. If the perturbation layer is above the waveguide layer, the perturbation layer may be immediately above the waveguide layer, with no gap between the waveguide layer and the perturbation layer. Alternatively, there may be a gap between the waveguide layer and the perturbation layer. The perturbation layer may also include multiple emitter layers, each emitter layer including multiple emitter elements spaced at a periodic interval. The grating period of each emitter layer may be the same or different. Additionally, the emitter elements of each emitter layer may be offset from each other by some distance.

Figure 11:
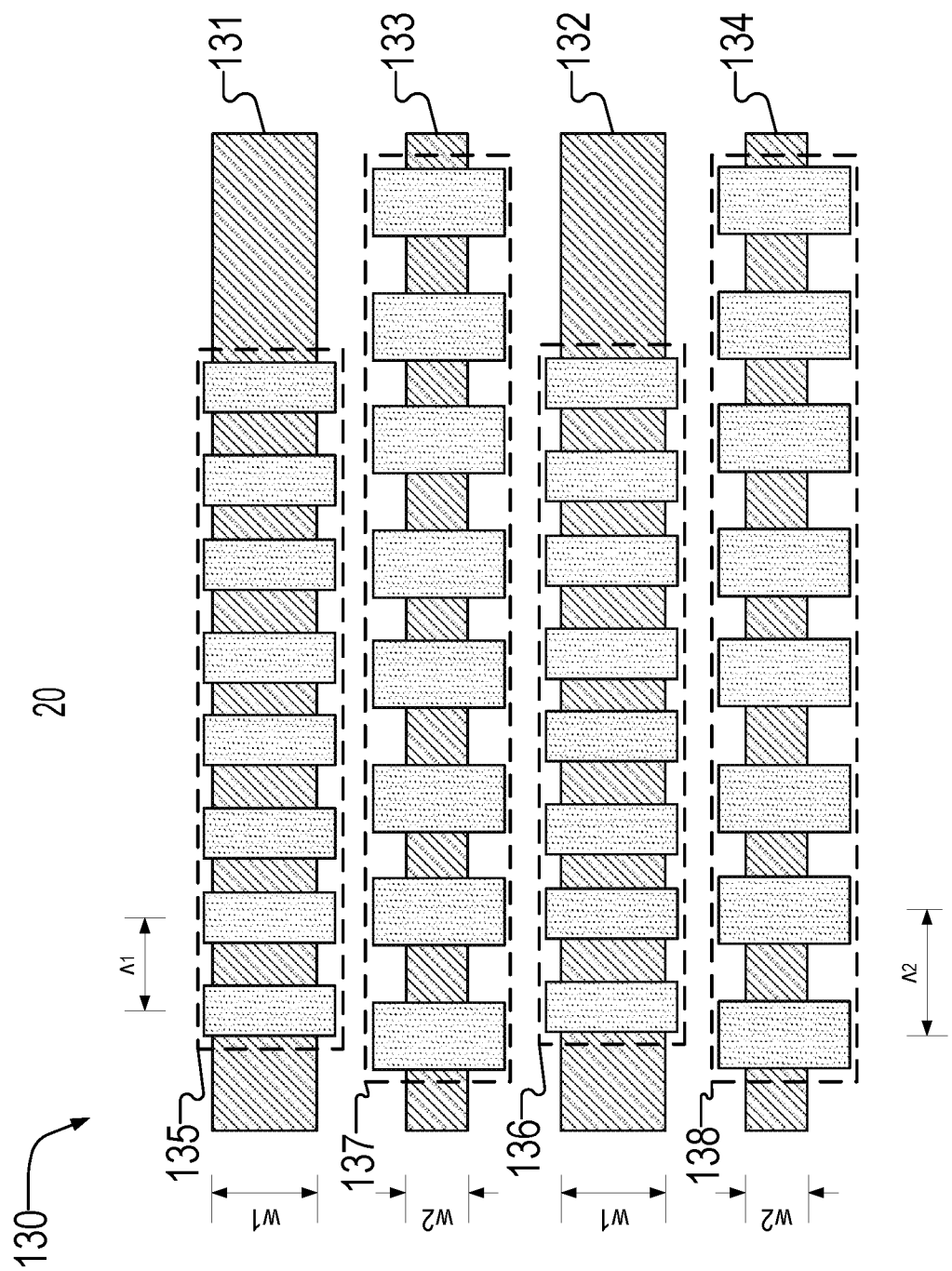
FIG. 11 is a top view of a waveguide array with waveguide cores of alternating widths and grating antennas with different grating periods.

Referring to FIG. 11, a waveguide array 130 include multiple waveguide cores 131-134 and multiple grating antennas 135-138 associated with a respective waveguide core. The waveguide cores 131-132 have a first width, $w_1$, and therefore have a first propagation constant. The waveguide cores 133-134 have a second width, $w_2$, and therefore have a second propagation constant. Therefore, adjacent waveguides have different propagation constants. The grating antennas 135-138 are formed in a perturbation layer that is above the waveguide layer in which the waveguide cores 131-134 are formed. The grating antennas 135-136 include multiple emitter elements spaced with a first grating period, $\Lambda_1$, and each emitter element having a first length, first width and first depth. The grating antennas 137-138 include multiple emitter elements spaced with a second grating period, $\Lambda_2$, greater than the first grating period, and each emitter element having a second length, second width and second depth.

Separate Perturbation Layer and Waveguide Layer

As mentioned above, the perturbation layer may be at the same depth level as the waveguide layer or at a different level. Separating the perturbation layer and the waveguide layer may have a number of advantages. For example, embodiments that separate the perturbation layer and the waveguide layer may allow an optical device to have a larger fill factor as compared to forming the perturbation layer and the waveguide layer at the same depth level. Separating the layers also reduces or eliminates the need to use partial etching in forming the antennas, resulting in more precisely formed, robust antennas.

Figure 12:
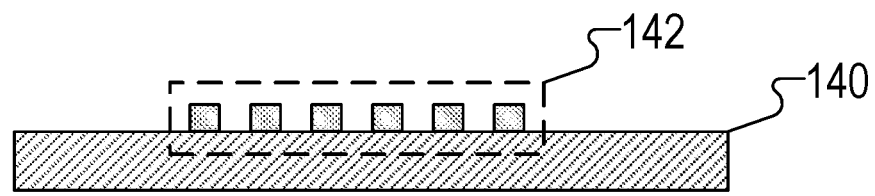
FIG. 12 is a side view of a waveguide and a separate perturbation layer that includes a grating antenna.

Referring to FIG. 12, a waveguide core 140 is located in a waveguide layer that is at a first depth level and a grating antenna 142 is located in a perturbation layer that is at a second depth level different from the first depth level. The perturbation layer is above the waveguide layer, but the emitter elements of the grating antenna 142 are in physical contact with the waveguide core 140. Thus, while the perturbation layer and the waveguide layer are separate and distinct layers from one another, there is no gap between the two layers (i.e., the distance between the two layers is zero). The cladding material and other elements are not shown for clarity.

Figure 13:
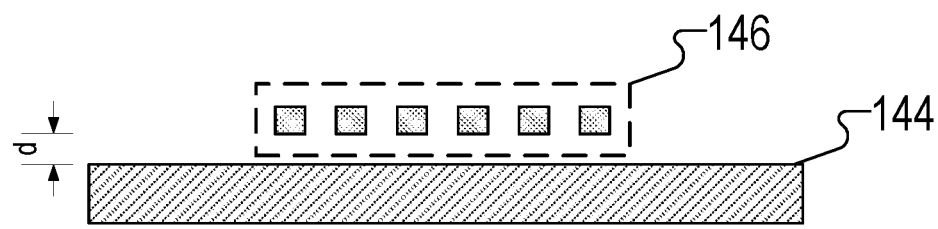
FIG. 13 is a side view of a waveguide and a separate perturbation layer that includes a grating antenna separated by a non-zero distance from a waveguide core.

Referring to FIG. 13, a waveguide core 144 is located in a waveguide layer that is at a first depth level and a grating antenna 146 is located in a perturbation layer that is at a second depth level different from the first depth level. The perturbation layer is above the waveguide layer and the emitter elements of the grating antenna 146 are not in physical contact with the waveguide core 144. Thus, the perturbation layer and the waveguide layer are separated from one another by a non-zero gap distance, d. The cladding material and other elements are not shown for clarity.

An optical device with a grating antenna formed from a single emitter layer, as illustrated in FIGS. 12-13, may not efficiently emit optical power in a single direction, e.g., vertically upward. To increase the optical power emitted from the grating antenna, the perturbation layer may include two or more emitter layers. The optical power emitted in a single direction can be greater than 50% and increased to greater than 90%, and in some cases greater than 99% by tuning the layer depths, the distance between emitter layers and the waveguide, and the offset between emitter elements of each emitter layer.

While a mirror could be used to redirect the light emitted downward from a single emitter layer upwards, the spacing of the mirror would need to be set at a well-defined spacing $d=\lambda/4+\lambda/2\, m$, where m=0, 1, 2 . . . , with small values of m being more desirable due to reduced angular and wavelength dependence. It is challenging to find a distance d that meets this condition and fits within the process layer stack sufficiently far away from a waveguide layer so as not to induce absorption in the guided mode of the waveguide. Accordingly, it is preferable not to use mirrors for this purpose in an optical device. Instead of using a metal layer to reflect the downward light emission upwards, a second emitter layer is included in the perturbation layer. For example, to emit light vertically upward (i.e., the direction of emission is normal to the plane of the optical device), the emitter elements of the second emitter layer are shifted by $\pi/2$ in their temporal phase from the first layer and are additionally separated by a distance $\lambda/4$ from the first emitter layer. This configuration is mathematically similar to a pair of dipole radiators separated by a distance $\lambda/4$ with a $\pi/2$ phase advance in the bottom dipole's excitation waveform. The result is that light emitted in the downward direction from the emitter layers is $\pi$ out of phase with one another and the light emitted in the upward direction is in phase with one another thereby increasing the amount of optical power directed in the upward direction. Additionally, the offset and separation of the emitter layers can be adjusted to different values in order to emit light at angles other than zero degrees, i.e., an emission direction that is not directly upward.

Figure 14:
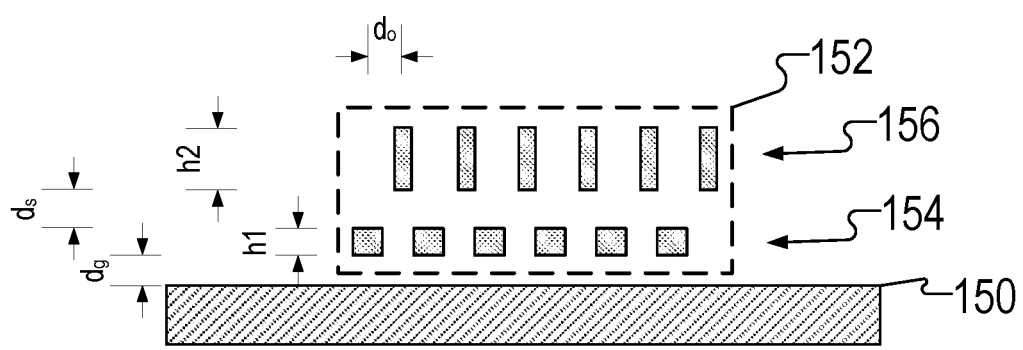
FIG. 14 is a side view of a waveguide and a separate perturbation layer that includes multiple emitter layers, each emitter layer including a grating antenna separated by a non-zero distance from a waveguide core.

Referring to FIG. 14, a waveguide core 150 is located in a waveguide layer that is at a first depth level and a grating antenna 152 is located in a perturbation layer that is at a second depth level different from the first depth level. The perturbation layer is above the waveguide layer and includes a first emitter layer 154 and a second emitter layer 156. Each of the emitter layer 154 and 156 includes multiple emitter elements that form the grating antenna 146. Neither emitter layer is in in physical contact with the waveguide core 150. The first emitter layer 154 is separated from the waveguide core 150 by a gap distance, $d_g$. The second emitter layer is separated from the first emitter layer by a separation distance, $d_s$.

Each emitter element of the first emitter layer 154 have a first length in a longitudinal direction along the length of the waveguide core 150 and each emitter element of the second emitter layer 156 have a second length in the longitudinal direction. The lengths of the emitters in each emitter layer may be different. For example, as illustrated, the emitter element length of the first emitter layer 154 is greater than the emitter element length of the second emitter layer 156. However, the emitter element length of the first emitter layer 154 may also be less than or equal to the emitter element length of the second emitter layer 156.

The first emitter layer 154 has a first thickness, $h_1$, in the depth direction and the second emitter layer 156 has a second thickness, $h_2$, in the depth direction. The second thickness, $h_2$, may be greater than the first thickness, $h_1$, to ensure that the second emitter layer 156 perturbs the light guided by the waveguide with the same strength as the first emitter layer 154. This is due to the intensity of the light guided by the waveguide decreasing as a function of distance from the waveguide core 150. Other techniques for ensuring the perturbation of the two emitter layers are approximately equal may also be used. For example, instead of forming the first emitter layer 154 and the second layer 156 from the same material, as illustrated in FIG. 14, the emitter elements of the first emitter layer 154 may be formed from a different material than the emitter elements of the second emitter layer 156. For example, if the emitter elements of the second emitter layer 156 are formed from a material with a larger dielectric constant than a material used to form the emitter elements of the first emitter layer 154, then the thickness in the depth direction of the two emitter layers may be approximately equal.

The direction light is emitted by the grating antenna 152 can be tuned by setting the gap distance, $d_g$, the separation distance, $d_s$, and also an offset distance, $d_o$, which is a distance that the center of the emitter elements of the second emitter layer 156 are offset relative to the center of the emitter elements of the first emitter layer 154. For example, to tune the emission direction to be vertical in the upward direction, the offset distance, $d_o$, is approximately $\pm\lambda_{eff}/4 + m\lambda/2$, wherein $\lambda_{eff}$ is an effective wavelength of light guided by the waveguide and m is an integer, and the separation distance, $d_s$, is approximately $\lambda_c/4 + n\lambda_c/2$, wherein n is an integer and $\lambda_c$ is an effective wavelength of light in the cladding volume. Other angles of emission can be achieved by setting the offset distance, $d_o$, and the separation distance, $d_s$, to different values. For example, as shown in FIG. 12, the first offset distance, $d_o$, is positive, meaning the light traveling from left to right through the waveguide first encounters the first emitter layer 154, not the second emitter layer 156. This results in the majority of the light being emitted in an upward vertical direction. If the offset distance, $d_o$, is instead set to be negative, meaning the light traveling from left to right through the waveguide first encounters the second emitter layer 156, not the first emitter layer 154, then the majority of the light emitted by the grating antenna 152 is emitted in a downward vertical direction.

The emitter elements of any grating antenna used in example optical devices may be formed from various materials. For example, silicon, silicon nitride, poly/amorphous silicon, liquid crystals, aluminum nitride, indium titanium oxide, metals, or germanium may be used to form emitter elements. In some embodiments, a material used to form a grating antenna above a waveguide core may have a higher index of refraction than a material from which the waveguide core is formed. Additionally, as discussed above, if a perturbation layer of a grating antenna includes multiple emitter layers, then each emitter layer may be formed from different materials. For example, a first emitter layer that is nearer to a waveguide core than a second emitter layer may be formed from a material with an index of refraction that is less than the index of refraction of a material used to form the second emitter layer.

To change the emission rate along the waveguide core 150, the gap distance, $d_s$, between the waveguide layer and the first emitter layer can be changed. Changing this distance is independent of the profile of the layers themselves so new lithography masks do not have to be fabricated to change the emission rate of the antenna from wafer to wafer. Furthermore, changing the gap distance, $d_s$, does not change the directionality of the emission because the directionality is determined by the horizontal and vertical offset of the emitter layers 154 and 156. Changing the gap distance, $d_s$, allows for a robust and inexpensive way to tune the emission of light from an optical device.

Phase Shifter Pitch Reduction

Figure 15:
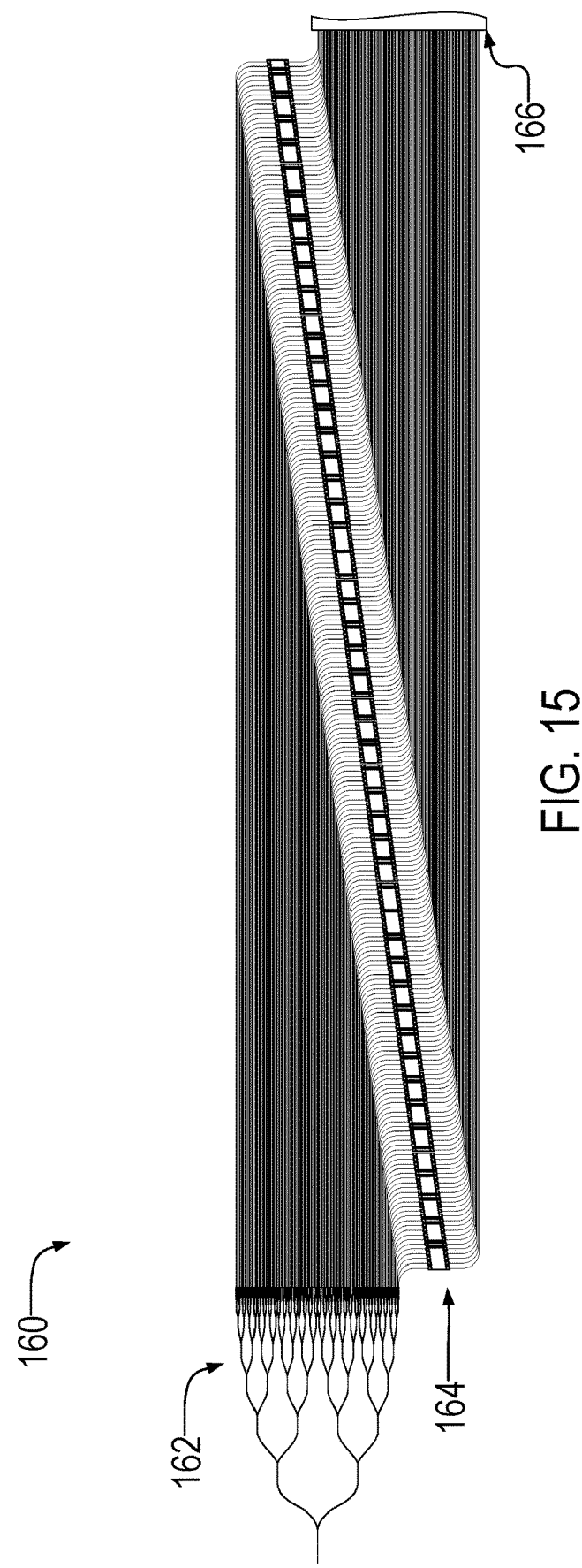
FIG. 15 is a top view of non-scalable phase shifter array, according to the prior art.

Electro-optic phase shifters are waveguides (e.g., formed from silicon waveguide cores) that are embedded with p-n and p-i-n diodes using, for example, ion implantation. Within the waveguides, electrical field based DC Kerr effect and/or plasma dispersion effect alter the refractive index of silicon waveguide core causing a controllable phase shift for light guided by the waveguide. To efficiently fabricate a compact optical device that includes an array of phase shifters, the phase shifters should be scalable to large arrays. Referring to FIG. 15, a prior art optical device 160 includes multiple waveguides 162, each waveguide having an associated phase shifter 164 that has a pitch that is greater than the pitch as the waveguides 162. With a phase shifter pitch that is greater than the pitch of the waveguides, it is necessary to include a "zig-zag" in the path of the waveguides 162 to accommodate the phase shifters 164 or some other waveguide route that uses a larger surface area than simple parallel waveguides, such as a fan-out or a fan-in. The area used by the phase shifters 164 therefore increases as the number of waveguides increases, reducing the fill factor of the optical device. The optical device 160 includes a light-emitting region 166 that includes at least one antenna for each light path associated with a respective waveguide 162. By reducing the pitch of the phase shifters, the fill factor can be increased such that the light-emitting region 166 consumes a larger percentage of the area of the optical device 160.

Figure 16:
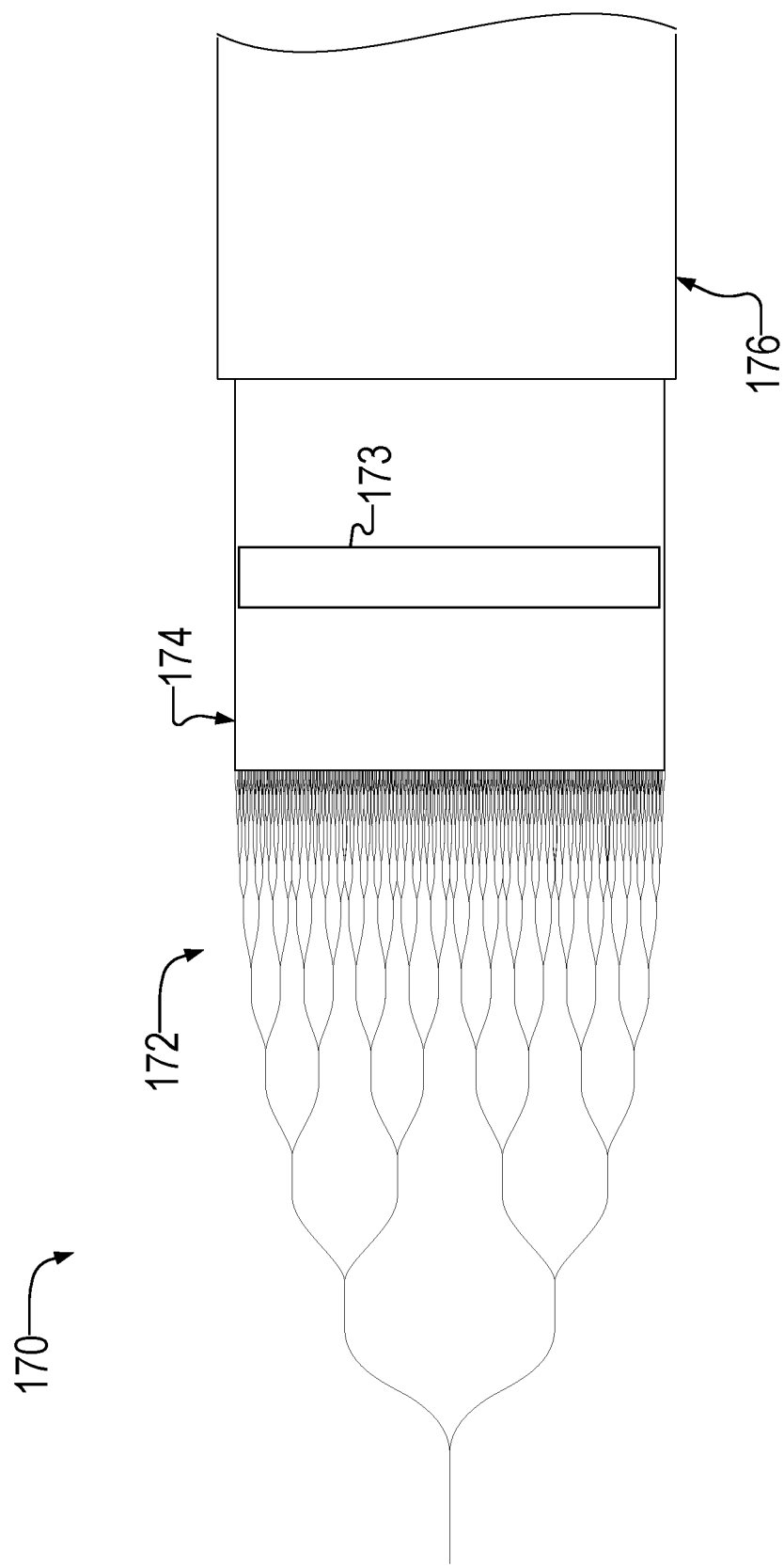
FIG. 16 is a top view of scalable phase shifter array.

Referring to FIG. 16, an optical device 170 includes a multiple waveguides 172, each waveguide having an associated phase shifter (an array of phase shifters 173 being represented by a box, for the sake of clarity) within a phase shifter region 174, and the phase shifters of the array of phase shifters 173 having a pitch that is equal to the pitch of the waveguides 172. For the sake of clarity, the waveguides are not shown in the phase shifter region 174. The optical path formed from a waveguide in the phase shifter region 174 also includes another waveguide, possibly at a different depth level, within a light-emitting region 176.

Two contacts are required to drop a voltage potential across p and n sides of the diodes of a phase shifter. However, contacts are made out of metals that are not transparent to portions of the optical spectrum of interest (1.1 µm<λ<3 µm). Thus, when tight pitched electro-optic phase shifters are used, metal contacts used to bring signals to the diode used to induce a phase shift create undesirable losses in the optical device 170. This is because the optical mode of the waveguide overlaps more with the volume occupied by the metal contact. When the pitch of the phase shifters is less than one wavelength of the light guided by the waveguide, and especially as the pitch approaches one-half of one wavelength of the light guided by the waveguide, the metal contacts should be moved farther from the waveguide core to ensure the metal contacts are isolated from the guided mode of the waveguide. One solution to efficiently bring the voltage potential from the metal contacts to the diodes is to use highly doped, low resistance semiconductor contact extension regions, which have less optical loss than metal, in the vicinity of the waveguide core. This may be achieved by extending the silicon of the diode in a vertical direction to form raised semiconductor pillars that are in contact with a metal contact at a distance greater than one-half wavelength from the waveguide core. The semiconductor pillars may be extended in an upward or a downward direction. The semiconductor pillars can be etched from a silicon wafer or epitaxially grown and are doped to with the same dopant type as the side of the diode in which it is in contact.

Figure 17:
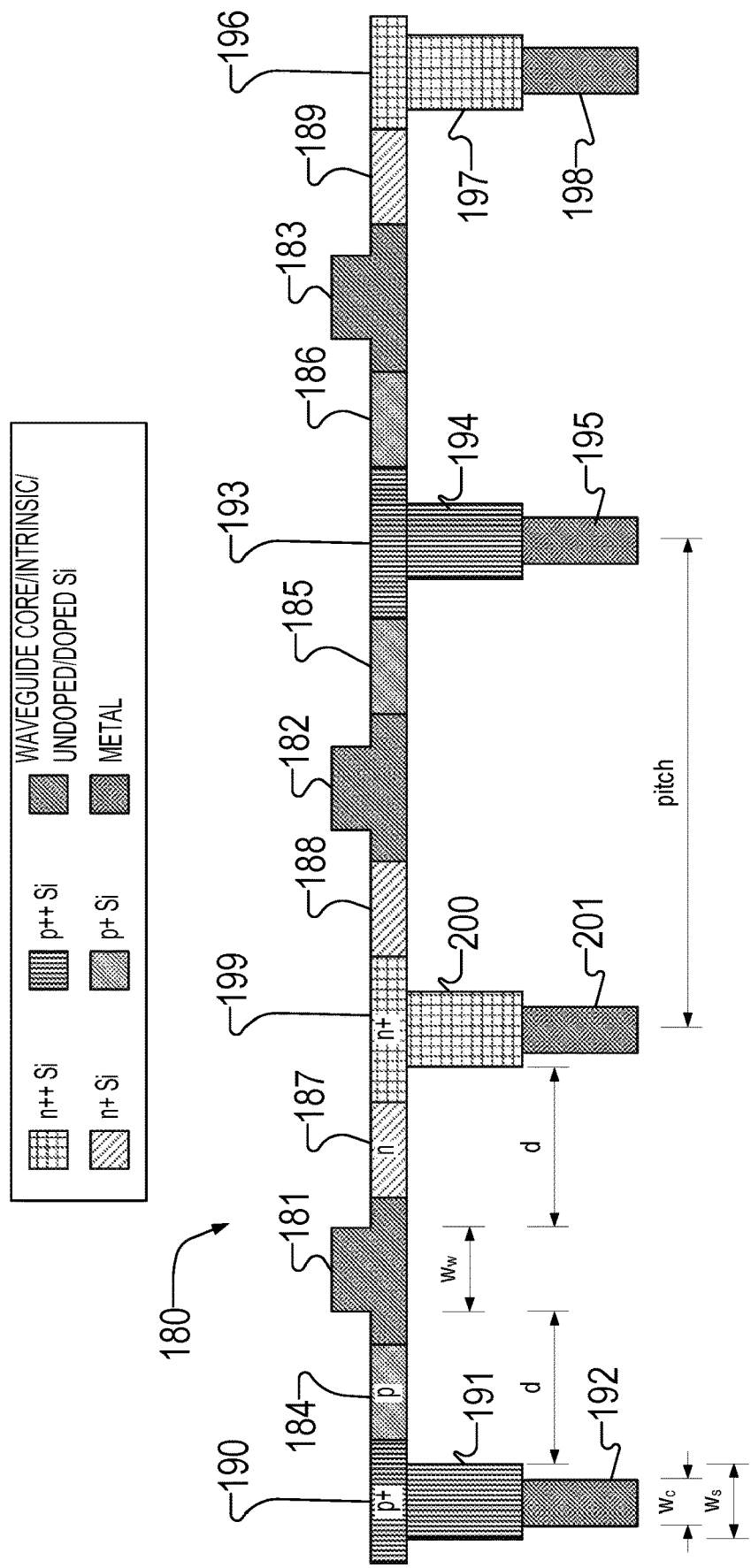
FIG. 17 is a cross-section view of a portion of a scalable phase shifter with metal contacts approaching the phase shifter from the bottom.

Referring to FIG. 17, an optical device 180 includes waveguide cores 181-183 in an array of parallel waveguides. The waveguide cores 181-183 can be formed, for example, from intrinsic silicon, undoped silicon, or doped silicon. The waveguide core 181 is in physical contact with a p-type semiconductor region 184, the waveguide core 182 is in physical contact with a p-type semiconductor region 185, and the waveguide core 183 is in physical contact with a p-type semiconductor region 186. The waveguide core 181 is also in physical contact with an n-type semiconductor region 187, the waveguide 182 is in physical contact with an n-type semiconductor region 188, and the waveguide core 183 is in physical contact with an n-type semiconductor region 189.

A semiconductor contact for the p-type semiconductor region 184 is formed from a p-type semiconductor contact region 190 and a p-type semiconductor contact extension region 191, both having a higher dopant concentration than the p-type semiconductor region 184. The p-type semiconductor contact extension region 191 is extended in a downward vertical direction, such that a bottom surface of the p-type semiconductor contact extension region 191 is below a bottom surface of the waveguide core 181. The depth of the bottom surface of the p-type semiconductor contact extension region 191 may be, for example, 250 nm or 800 nm below the bottom surface of the waveguide core 181. A metal contact 192 is in physical contact with the bottom surface of the p-type semiconductor contact extension region 191 and is configured to bring electrical signals to the p-type semiconductor region 184.

A semiconductor contact for the p-type semiconductor region 185 and the p-type semiconductor region 186 is formed from a p-type semiconductor contact region 193 and a p-type semiconductor contact extension region 194, both having a higher dopant concentration than the p-type semiconductor region 185 and the p-type semiconductor region 186. The p-type semiconductor contact extension region 194 is extended in a downward vertical direction, such that a bottom surface of the p-type semiconductor contact extension region 194 is below a bottom surface of the waveguide core 182 and a bottom surface of the waveguide core 183. The depth of the bottom surface of the p-type semiconductor contact extension region 194 may be, for example, 250 nm or 800 nm below the bottom surface of the waveguide core 182 and the bottom surface of the waveguide core 183. A metal contact 195 is in physical contact with the bottom surface of the p-type semiconductor contact extension region 194 and is configured to bring electrical signals to the p-type semiconductor region 185 and the p-type semiconductor region 186. The metal contact 195 is shared by the diode associated with waveguide core 182 and the diode associated with waveguide core 183 such that adjacent waveguide cores share one contact with each other.

A semiconductor contact for the n-type semiconductor region 189 is formed from an n-type semiconductor contact region 196 and an n-type semiconductor contact extension region 197, both having a higher dopant concentration the n-type semiconductor region 189. The n-type semiconductor contact extension region 197 is extended in a downward vertical direction, such that a bottom surface of the n-type semiconductor contact extension region 197 is below a bottom surface of the waveguide core 183. The depth of the bottom surface of the n-type semiconductor contact extension region 197 may be, for example, 250 nm or 800 nm below the bottom surface of the waveguide core 183. A metal contact 198 is in physical contact with the bottom surface of the n-type semiconductor contact extension region 197 and is configured to bring electrical signals to the p-type semiconductor region 189.

A semiconductor contact for the n-type semiconductor region 187 and the n-type semiconductor region 188 is formed from an n-type semiconductor contact region 199 and an n-type semiconductor contact extension region 200, both having a higher dopant concentration than the n-type semiconductor region 187 and the n-type semiconductor region 188. The n-type semiconductor contact extension region 200 is extended in a downward vertical direction, such that a bottom surface of the n-type semiconductor contact extension region 200 is below a bottom surface of the waveguide core 181 and a bottom surface of the waveguide core 182. The depth of the bottom surface of the n-type semiconductor contact extension region 200 may be, for example, 250 nm or 800 nm below the bottom surface of the waveguide core 181 and the bottom surface of the waveguide core 182. A metal contact 201 is in physical contact with the bottom surface of the n-type semiconductor contact extension region 200 and is configured to bring electrical signals to the n-type semiconductor region 187 and the n-type semiconductor region 188. The metal contact 201 is shared by the diode associated with waveguide core 181 and the diode associated with waveguide core 182 such that adjacent waveguide cores share one contact with each other.

While the optical device 180 may be formed using many different dimensions, one set of dimensions is provided as an example. The waveguides of the optical device 180 are configured to guide light with a wavelength equal to 1550 nm. The pitch of the optical device 180 (i.e., the distance between the center points of each metal contact) is approximately one-half of one wavelength. For example, the pitch may be 760 nm or 800 nm. The waveguide core width, $w_w$, is approximately one-quarter of one wavelength. For example, the waveguide core width, $w_w$, may be approximately 400 nm. The distance, d, between a side surface of each semiconductor contact extension region and a side surface of a respective waveguide core is approximately 100 nm. A semiconductor contact extension region width, $w_s$, is approximately 200 nm. A metal contact width, w, is approximately 160 nm. These widths may vary from waveguide to waveguide in order to introduce phase mismatch between adjacent waveguides. Accordingly, even within a single device, these widths may vary by ±50 nm.

In the semiconductor contact of the optical device 180, a concentration of a respective dopant may vary as a function of depth. For example, the concentration of a dopant of a particular semiconductor contact at the bottom surface of the semiconductor contact extension region may be greater than a second concentration of the dopant of the semiconductor contact at the top surface of the semiconductor contact. In other words, the dopant concentration of the semiconductor contact is higher near the metal contact and lower near the waveguide core. The dopant concentration may vary discontinuously or continuously with a smooth gradient. The semiconductor contact can be formed from, for example, silicon or silicon germanium and may be formed from the same or a different material than the waveguide cores.

While FIG. 17 illustrates semiconductor contacts that extends downward, in a direction away from the top surfaces of the waveguide cores, semiconductor contacts may extend vertically in an upward direction, in the same direction as the top surface of the waveguide core. Referring to FIG. 18, an optical device 210 includes a plurality of parallel waveguide cores similar to those of FIG. 17, but only a single waveguide core 212 is shown for simplicity, which may be formed from undoped silicon or doped silicon. A first side surface of the waveguide core 212 is in physical contact with an n-type semiconductor region 217 and a second side surface of the waveguide core 212, opposite the first side surface, is in physical contact with a p-type semiconductor region 213. The p-type semiconductor region 213 is in physical contact with a semiconductor contact that includes a p-type semiconductor contact region 214 and a p-type semiconductor contact extension region 215. A metal contact 216 comes from above and is in physical contact with the p-type semiconductor contact extension region 215. The n-type semiconductor region 217 is in physical contact with a semiconductor contact that includes an n-type semiconductor contact region 218 and an n-type semiconductor contact extension region 219. A metal contact 220 comes from above and is in physical contact with the n-type semiconductor contact extension region 219.

A top surface of the p-type semiconductor contact extension region 215 and a top surface of the n-type semiconductor contact extension region 219 are at a depth level that is above the top surface of the waveguide core 212. For example, the depth of the top surface of each semiconductor contact extension region may be 250 nm or 800 nm above the top surface of the waveguide core 212. The optical device 210 of FIG. 18 has many of the same features as the optical device 180 of FIG. 17, but the metal contacts 216 and 220 approach the diode associated with a particular waveguide from the top.

Increased Depletion within Waveguide Core

In some embodiments, phase shifter waveguides the waveguide core may be formed from an n-type semiconductor region and a p-type semiconductor region. The resulting n-p-n-p junction structure may result in a waveguide core with increased electron-hole depletion in the waveguide core resulting in less optical loss than the p-i-n structures described above. A phase shifter with the n-p-n-p junction may use the aforementioned semiconductor contact extension technique to keep the metal contact isolated from the vicinity of the waveguide core.

Figure 19A:
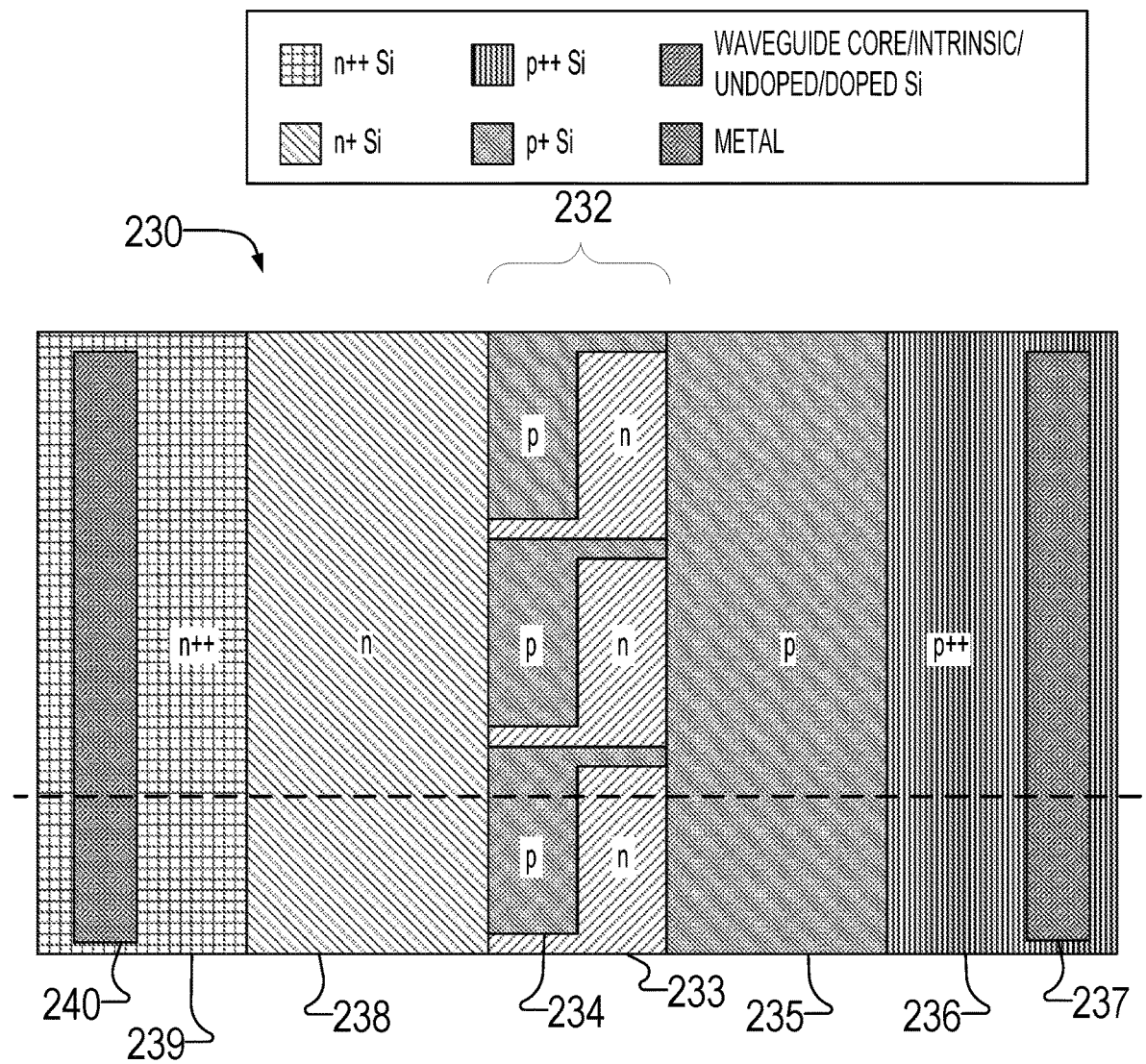
FIG. 19A is top view of a portion of a scalable phase shifter with a waveguide core with an n-type core region and a p-type core region.
Figure 19B:
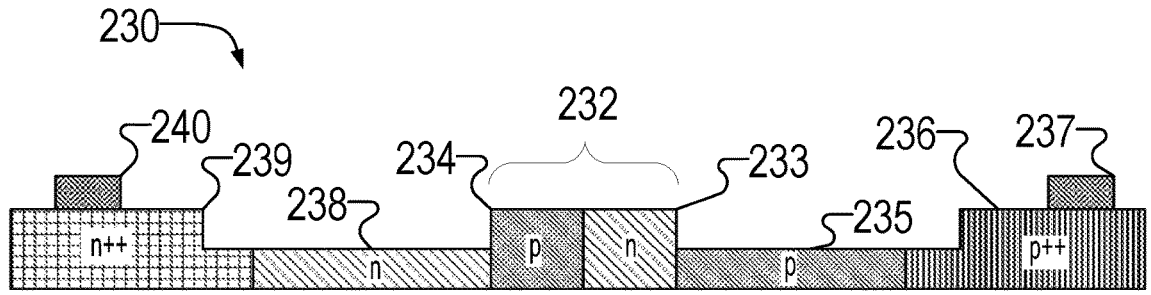
FIG. 19B is cross-sectional view of a portion of the scalable phase shifter of FIG. 19A.

Referring to FIG. 19A and FIG. 19B, an optical device 230 includes a waveguide core 232 that includes an n-type semiconductor core region 233 and a p-type semiconductor core region 234. The dashed line of FIG. 19A illustrates the cross-sectional plane used to form the cross-sectional view of FIG. 19B. The n-type semiconductor core region 233 has a longitudinal portion that extends in the longitudinal direction along the length of the waveguide and is not as wide as the width of the waveguide core 232 and a transverse portion that is the entire width of the waveguide core 232 and extends in a transverse direction that is perpendicular to the depth direction and the longitudinal direction. Thus, the overall shape of the n-type semiconductor core region 233 is an "L-shape." The p-type semiconductor core region 234 has a longitudinal portion that extends in the longitudinal direction along the length of the waveguide and is not as wide as the width of the waveguide core 232 and a transverse portion that is the entire width of the waveguide core 232 and extends in a transverse direction that is perpendicular to the depth direction and the longitudinal direction. Thus, the overall shape of the p-type semiconductor core region 233 is an "L-shape." The n-type semiconductor core region 233 and the p-type semiconductor core region 233 together form a rectangular shape. The waveguide core 232 includes multiple n-type semiconductor core regions and multiple p-type semiconductor core regions repeated in the same arrangement along the length of the waveguide core 232.

Adjacent to the n-type semiconductor core region 233 is a p-type semiconductor region 235 that extends longitudinally along the length of the waveguide core 232. The p-type semiconductor region 235 is in physical contact with both the n-type semiconductor core region 233 and the p-type semiconductor core region 234. Specifically, p-type semiconductor region 235 is in physical contact with the longitudinal portion of the n-type semiconductor core region 233 and the transverse portion of the p-type semiconductor core region 234. A level of a top surface of the waveguide core 232 is above a level of a top surface of the p-type semiconductor region 235 in the depth direction.

Adjacent to the p-type semiconductor core region 234 is an n-type semiconductor region 238 that extends longitudinally along the length of the waveguide core 232. The n-type semiconductor region 238 is in physical contact with both the n-type semiconductor core region 233 and the p-type semiconductor core region 234. Specifically, n-type semiconductor region 238 is in physical contact with the longitudinal portion of the p-type semiconductor core region 234 and the transverse portion of the n-type semiconductor core region 233. A level of a top surface of the waveguide core 232 is above a level of a top surface of the n-type semiconductor region 238 in the depth direction.

The p-type semiconductor region 235 is in physical contact with a p-type semiconductor contact region 236, which is in contact with a metal contact 237. The n-type semiconductor region 238 is in physical contact with an n-type semiconductor contact region 239, which is in contact with a metal contact 240.

Staggered Phase Shifter Contacts

Figure 21:
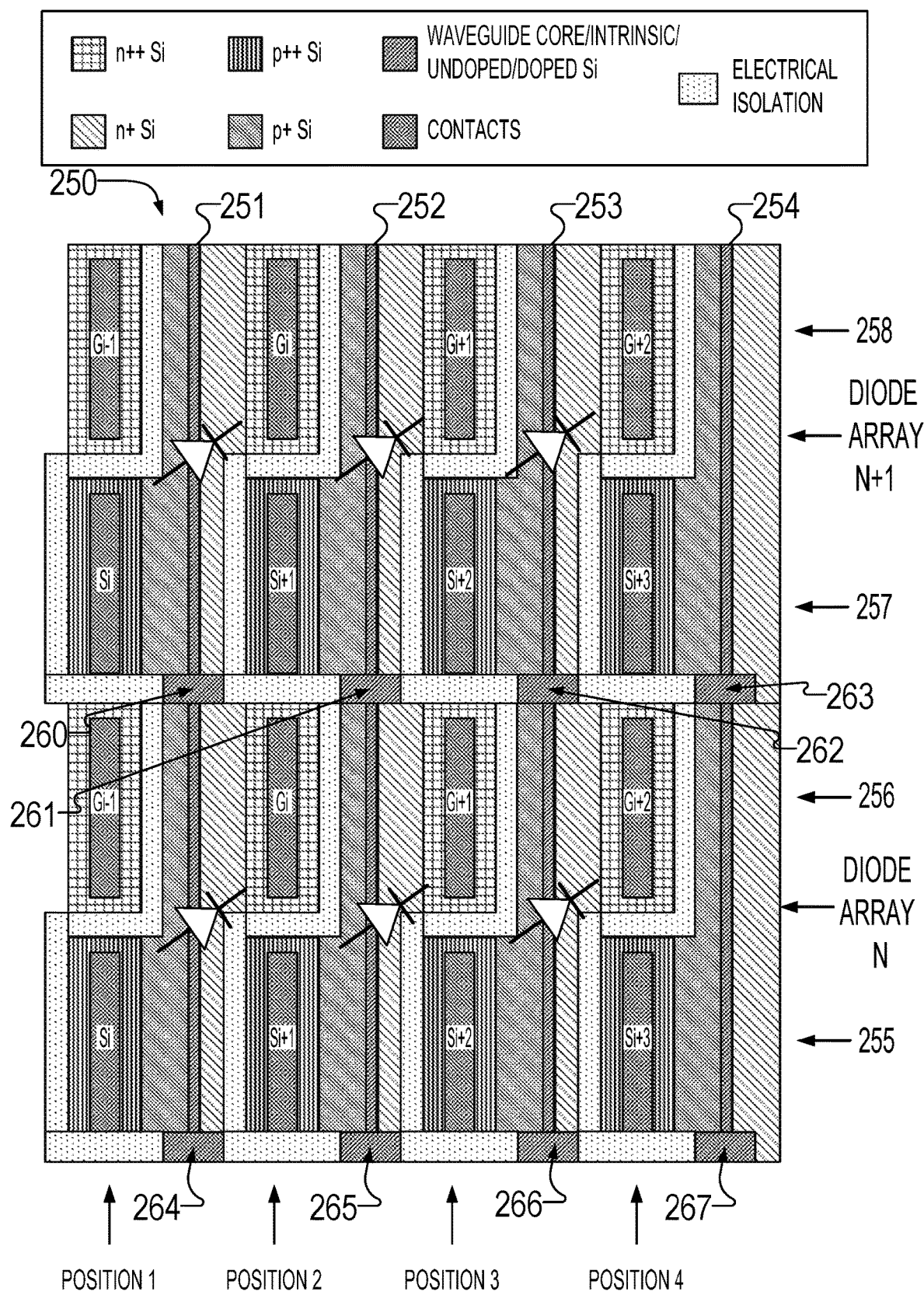
FIG. 21 is a top view of an array of phase shifters.

By staggering the contacts of the phase shifters, the pitch of the phase shifter may be decreased in contrast to when the contacts of the phase shifters are not staggered. Referring to FIG. 21, an optical device 250 includes multiple waveguide cores 251-254 disposed in an array oriented perpendicular to a longitudinal direction. Each waveguide core of the plurality of waveguide cores is elongated in the longitudinal direction, which is shown vertically in FIG. 21. The array is oriented in the horizontal direction such that each waveguide of the array is to the left of the right of at least one other waveguide of the array.

Multiple diode signal contacts ($S_i$, $S_{i+1}$, etc.) are disposed in a first signal contact array 255 oriented in a transverse direction that is perpendicular to the longitudinal direction. A respective waveguide core separates each signal contact from an adjacent signal contact. For example, waveguide core 251 separates signal contact $S_i$ from signal contacts $S_{i+1}$. The array of signal contacts is oriented in the horizontal direction such that each signal contact of the array is to the left of the right of at least one other signal contact of the array. Thus, each signal contact has a position within the array, the positions being labeled across the bottom of FIG. 20.

Multiple diode ground contacts ($G_i$, $G_{i+1}$, etc.) are disposed in a first ground contact array 256 oriented in the transverse direction. A respective waveguide core separates each ground contact from an adjacent ground contact. For example, waveguide core 253 separates signal contact $G_{i+1}$ from signal contacts $G_{i+2}$. The array of ground contacts is oriented in the horizontal direction such that each ground contact of the array is to the left of the right of at least one other ground contact of the array. Thus, each ground contact has a position within the array, the positions being labeled across the bottom of FIG. 20.

Multiple diodes are formed in an array perpendicular to the longitudinal direction, wherein each diode of the plurality of diodes includes a first diode ground contact from the first ground contact array 256, and a first diode signal contact from the first signal contact array 255. For example, a first diode is formed from the signal contact $S_i$, which at a first position within the array of signal contacts, and the ground contact $G_i$, which at a second position within the array of ground contacts. Thus, in the example shown, the diodes are formed using contacts that are staggered relative to one another because they are not at the same position within their respective array.

Figure 20:
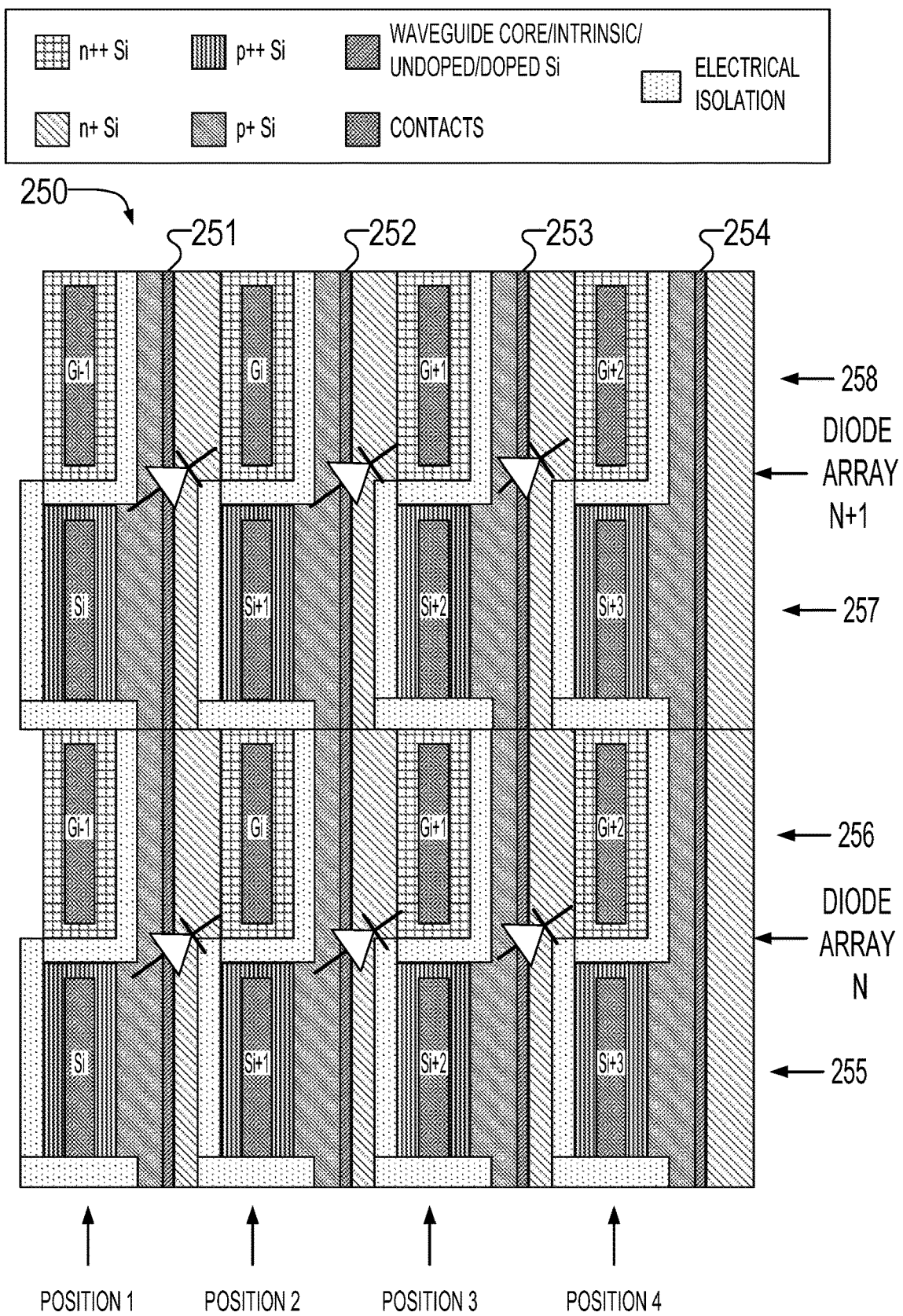
FIG. 20 is a top view of an array of phase shifters.

In some embodiments, the signal contact array 255 is one of multiple signal contact arrays and the ground contact array 256 is one of multiple signal contact arrays. FIG. 20 illustrates one additional signal contact array 257 and one additional ground contact array 258. It should be understood that what is shown in FIG. 20 is only a portion of the optical device 250 and additional arrays may be repeated in the vertical direction and the arrays themselves may include more elements in the horizontal direction.

In the optical device 250, diodes within a column are isolated from one another using an electrical isolation material. Thus, each column of diodes, which corresponds to a respective waveguide, are independently controlled. In other embodiments, each signal contact array of the multiple signal contact arrays is independently controlled. This can be achieved by including an additional electrical isolation component that is formed from the same material as the waveguides between each array of diodes. Referring to FIG. 21, which is the same as FIG. 20, but with the addition of additional electrical isolation components 260-267. The electrical isolation components 260-263, for example, electrically isolate the diodes in the diode array N+1 from the diodes in the diode array N.

Other Considerations

Other examples and implementations are within the scope and spirit of the disclosure and appended claims. For example, individual elements of optical devices described above may be used in other application or devices not discussed. Additionally, individual elements of optical devices described above may be combined in ways not described in detail above.

Some of the example embodiments described above were described as using light with a wavelength of approximately 1550 nm. Embodiments are not limited, however, to any particular wavelength. For example, some embodiments may use light at longer wavelengths, such as approximately 10 µm, which penetrates fog better than light with a wavelength of 1550 nm. As a further example, it may be advantageous for some applications to use light in the visible spectrum. Accordingly, light with a wavelength in the range of 550 nm-750 nm may be used. It should be understood that if different wavelengths of light are used, the materials and dimensions of different components will be different from those described above in connection with particular example embodiments.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or parameter is "based on" an item or condition means that the function or parameter is based on the stated item or condition and may be based on one or more items and/or conditions in addition to the stated item or condition.

As used herein, unless otherwise stated, a statement that a parameter is "approximately" equal to a value means that the parameter is equal to the value or some other value within a 20% range of the stated value. For example, if a distance is "approximately equal" to 1000 nm, then the distance may be equal to any value within the inclusive range 800 nm to 1200 nm.

Specific details are given in the description to provide a thorough understanding of example configurations (including implementations). However, configurations may be practiced without these specific details. For example, well-known fabrication techniques, processes, and structures, have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Components, functional or otherwise, shown in the figures and/or discussed herein as being connected or optically coupled with each other are may be directly or indirectly connected or optically coupled. Meaning, there may be additional elements, not shown or described, between the components that are connected or optically coupled. Components, functional or otherwise, discussed herein as being in physical contact do not have additional elements between the components that are in physical contact with one another.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

When describing embodiments in reference to the drawings, direction references ("above," "below," "top," "bottom," "left," "right," "horizontal," "vertical," etc.) may be used. Such references are intended merely as an aid to the reader viewing the drawings in a normal orientation. These directional references are not intended to describe a preferred or only orientation of an embodied device. A device may be embodied in other orientations.

Several example configures include waveguides. Not all descriptions and drawings include a discussion of the cladding of the waveguides. It is to be understood that a waveguide is formed from a waveguide core and a cladding that is in physical contact with the waveguide core. The cladding may be a cladding volume that surrounds multiple waveguide cores and is formed from a material that has a lower index of refraction than a material used to form the waveguide cores.

Further, more than one invention may be disclosed.

What is claimed is:

1. An optical phase shifter comprising:
    a waveguide core comprising a top surface and a bottom surface;
    a waveguide cladding volume comprising a dielectric material adjacent to the waveguide core, the waveguide cladding volume forming at least one of: (1) a first surface by direct physical contact between the top surface of the waveguide core and a surface of the cladding volume, or (2) a second surface by direct physical contact between the bottom surface of the waveguide core and a surface of the cladding volume;

a semiconductor contact that is laterally displaced relative to the waveguide core and is electrically connected to the waveguide core; and a metal contact adjacent to the semiconductor contact, the metal contact forming a third surface by direct physical contact between a surface of the metal contact and a surface of the semiconductor contact, wherein the third surface is above the first surface or the third surface is below the second surface;

wherein (1) the semiconductor contact is extended in a direction perpendicular to the first surface such that a distance between the first surface and the third surface is greater than a thickness of the waveguide core in the direction perpendicular to the first surface, or (2) the semiconductor contact is extended in a direction perpendicular to the second surface such that a distance between the second surface and the third surface is greater than a thickness of the waveguide core in the direction perpendicular to the second surface.

2. The optical phase shifter of claim 1, wherein:
the semiconductor contact is a first semiconductor contact that is an n-type semiconductor contact; and
the optical phase shifter further comprises a second semiconductor contact that is n-type semiconductor contact that is laterally displaced relative to the waveguide core and is electrically connected to the waveguide core, wherein a top surface of the second semiconductor contact is above the first surface or a bottom surface of the second semiconductor contact is below the second surface.

3. The optical phase shifter of claim 1, wherein a width of the semiconductor contact is less than a width of the waveguide core.

4. The optical phase shifter of claim 1, wherein a first concentration of a dopant of the semiconductor contact in proximity to a top surface of the semiconductor contact is greater than a second concentration of the dopant of the semiconductor contact in proximity to a bottom surface of the semiconductor contact.

5. The optical phase shifter of claim 4, wherein a doping profile of the semiconductor contact smoothly transitions from the first concentration of the dopant of the semiconductor contact at the top surface of the semiconductor contact to the second concentration of the dopant of the semiconductor contact at the bottom surface of the semiconductor contact.

6. The optical phase shifter of claim 1, wherein the semiconductor contact comprises epitaxially grown semiconductor, deposited semiconductor, or etched semiconductor.

7. The optical phase shifter of claim 1, wherein the semiconductor contact comprises silicon or silicon germanium.

8. The optical phase shifter of claim 1, wherein the waveguide core comprises the same material as the semiconductor contact.

9. The optical phase shifter of claim 1, wherein:
the waveguide core is a first waveguide core having a first propagation constant; and
the optical phase shifter further comprises a second waveguide core having a second propagation constant that is different from the first propagation constant, wherein the second waveguide core is adjacent to the first waveguide core.

10. The optical phase shifter of claim 9, wherein the semiconductor contact is electrically connected to the second waveguide core.

11. The optical phase shifter of claim 1, wherein the waveguide core comprises a semiconductor material, and the waveguide cladding volume comprises a dielectric material.

12. The optical phase shifter of claim 1, wherein the waveguide core comprises a material having a first index of refraction $n_1$, the waveguide cladding volume comprises a material having a second index of refraction $n_2$, and $n_1-n_2$ is greater than or equal to 1.

13. A method of forming an optical phase shifter, the method comprising:
forming a waveguide core comprising a top surface and a bottom surface;
forming a waveguide cladding volume comprising a dielectric material adjacent to the waveguide core, the waveguide cladding volume forming at least one of: (1) a first surface by direct physical contact between the top surface of the waveguide core and a surface of the cladding volume, or (2) a second surface by direct physical contact between the bottom surface of the waveguide core and a surface of the cladding volume;
forming a semiconductor contact that is laterally displaced relative to the waveguide core and is electrically connected to the waveguide core; and
forming a metal contact adjacent to the semiconductor contact, the metal contact forming a third surface by direct physical contact between a surface of the metal contact and a surface of the semiconductor contact, wherein the third surface is above the first surface or the third surface is below the second surface;
wherein (1) the semiconductor contact is extended in a direction perpendicular to the first surface such that a distance between the first surface and the third surface is greater than a thickness of the waveguide core in the direction perpendicular to the first surface, or (2) the semiconductor contact is extended in a direction perpendicular to the second surface such that a distance between the second surface and the third surface is greater than a thickness of the waveguide core in the direction perpendicular to the second surface.

* * * * *

UNITED STATES PATENT AND TRADEMARK OFFICE
CERTIFICATE OF CORRECTION

| | |
|---|---|
| PATENT NO. | : 10,809,591 B2 |
| APPLICATION NO. | : 15/499468 |
| DATED | : October 20, 2020 |
| INVENTOR(S) | : Michael R. Watts et al. |

It is certified that error appears in the above-identified patent and that said Letters Patent is hereby corrected as shown below:

In the Specification

At Column 1, Line number 13, before the "BACKGROUND", please insert the following paragraph:
--STATEMENT AS TO FEDERALLY SPONSORED RESEARCH
This invention was made with government support under the following contract: DARPA Contract No. HR0011-16-C-0108. The government has certain rights in the invention.--

Signed and Sealed this
Thirtieth Day of August, 2022

Katherine Kelly Vidal
*Director of the United States Patent and Trademark Office*